(12) United States Patent
Sutharsan et al.

(10) Patent No.: US 11,616,596 B1
(45) Date of Patent: Mar. 28, 2023

(54) INSTRUCTION-BASED MULTI-THREAD MULTI-MODE PDSCH DECODER FOR CELLULAR DATA DEVICE

(71) Applicant: Apple Inc., Cupertino, CA (US)

(72) Inventors: Thirunathan Sutharsan, San Diego, CA (US); Mohanned Omar Sinnokrot, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/448,867

(22) Filed: Sep. 24, 2021

(51) Int. Cl.
| | |
|---|---|
| H04L 1/00 | (2006.01) |
| G06F 12/10 | (2016.01) |
| G06F 9/30 | (2018.01) |
| H04W 72/04 | (2023.01) |
| H04W 84/04 | (2009.01) |

(52) U.S. Cl.
CPC ........ *H04L 1/0047* (2013.01); *G06F 9/30145* (2013.01); *G06F 12/10* (2013.01); *H04L 1/0057* (2013.01); *H04W 72/04* (2013.01); *G06F 2212/174* (2013.01); *H04W 84/042* (2013.01)

(58) Field of Classification Search
CPC .................. H04L 1/0047; H04L 1/0057; H04L 1/0059; G06F 9/30145; G06F 12/10; G06F 2212/174; H04W 72/04; H04W 84/042
USPC ....................................................... 455/450
See application file for complete search history.

(56) References Cited

U.S. PATENT DOCUMENTS

| | | | | |
|---|---|---|---|---|
| 5,101,341 | A * | 3/1992 | Circello ................. | G06F 9/382 |
| | | | | 712/E9.034 |
| 5,809,320 | A | 9/1998 | Jain et al. | |
| 6,163,837 | A | 12/2000 | Chan et al. | |
| 2005/0081015 | A1* | 4/2005 | Barry .................... | G06F 9/3861 |
| | | | | 712/E9.046 |
| 2019/0361813 | A1* | 11/2019 | Zbiciak ............... | G06F 9/30145 |
| 2020/0042479 | A1* | 2/2020 | Wang .................... | G06F 9/3004 |
| 2020/0301826 | A1* | 9/2020 | Appu ..................... | G06F 12/04 |

OTHER PUBLICATIONS

Beltrame, Giovanni, "A Model for Assembly Instruction Timing and Power Estimation on Superscalar Architectures." Politecnico di Milano, final report, version 1.4. 2002. 88 pages.
Asanović, Krste, "Vector Microprocessors," A dissertation for the degree of Doctor of Philosophy in Computer Science in the Graduate Division of the University of California, Berkeley. Spring 1998. 268 pages.

* cited by examiner

*Primary Examiner* — Don N Vo
(74) *Attorney, Agent, or Firm* — Kilpatrick Townsend & Stockton LLP

(57) ABSTRACT

A cellular modem processor can include dedicated processing engines that implement specific, complex data processing operations. To implement physical downlink shared channel (PDSCH) decoding, a cellular modem can include a pipeline having multiple processing engines, with the processing engine including functional units that execute instructions corresponding to different stages in the PDSCH decoding process. Flow control and data synchronization between instructions can be provided using a hybrid of firmware-based flow control and hardware-based data dependency management.

20 Claims, 18 Drawing Sheets

INSTRUCTION-BASED MULTI-THREAD MULTI-MODE PDSCH DECODER FOR CELLULAR DATA DEVICE

CROSS-REFERENCES TO RELATED APPLICATIONS

This disclosure includes subject matter related to the following U.S. patent applications: U.S. patent application Ser. No. 17/448,863, filed Sep. 24, 2021, and U.S. patent application No. 63/261,649, filed Sep. 24, 2021. The disclosures of these applications are incorporated herein by reference in their entirety.

BACKGROUND

The present disclosure relates generally to cellular data processing and, in particular, to a physical downlink shared channel (PDSCH) decoder for a cellular data device.

With the advent of high-speed cellular data communication, users of mobile devices are increasingly able to access information when and where they need it. Cellular data communication standards, promulgated by the 3rd Generation Partnership Project (3GPP), enable radio-frequency communication between a base station (typically implemented at a cellular antenna tower) and various user equipment (UE), which can be a mobile device such as a smart phone, tablet, wearable device, or the like, via an "uplink" from the UE to the base station and a "downlink" from the base station to the UE.

Standards promulgated by 3GPP include specifications for radio access networks (RANs), such as 4G Long-Term Evolution (referred to herein as "4G" or "LTE") and 5G New Radio (referred to herein as "5G" or "NR"). The 4G and 5G RAN specifications define multiple logical channels between the base station and the UE, including a physical uplink shared channel (PUSCH) and physical downlink shared channel (PDSCH) that transmit application-layer data, as well as a physical uplink control channel (PUCCH) and physical downlink control channel (PDCCH) that transmit control data used to specify various parameters associated with data transmission on the shared channels.

The specifications also define the sequence of operations used to prepare data for transmission as a radio-frequency (RF) signal on each channel. By way of example of the complexity involved, the general sequence of operations for PDSCH involves the following steps: The base station receives a transport block consisting of a sequence of data bits to be communicated to the UE. The base station adds cyclic redundancy check (CRC) bits, segments the transport block based on a maximum codeword size, adds CRC bits per-segment, encodes each segment using an encoding algorithm that adds parity bits to enable error correction, performs bit interleaving and rate matching operations that improve robustness against channel loss, and applies a scrambling algorithm. The resulting bit sequence is then mapped onto a sequence of modulation symbols that are assigned to subcarrier frequencies and time bins (typically referred to as "resource elements"). An inverse Fast Fourier Transform (IFFT) generates a digital representation of a waveform that can be converted to analog, mixed with a carrier frequency, and transmitted via an antenna (or antennal array) to the UE. The UE reverses the base-station operations to recover the data. For instance, the UE can receive the RF signal, extract a baseband signal by removing the carrier frequency, generate a digitized representation of the baseband signal, and apply a Fast Fourier Transform (FFT) to transform the signal to frequency domain. A demapper can apply a channel estimate to produce a sequence of log likelihood ratios (LLRs) representing the relative probability of each transmitted bit being either 0 or 1. The LLR sequence can be descrambled, de-interleaved and de-rate-matched, decoded, and error-corrected (based on parity and CRC bits after decoding), thereby producing output data blocks. For PUSCH, the sequence of operations is similar, with the roles of base station and UE reversed. PUCCH and PDCCH, which generally include smaller blocks of data, have their own associated sequences of operation. The particular operations and sequences may vary; for instance the shared channels for 4G and 5G use different encoding algorithms and a different order of interleaving and rate matching operations.

To manage these operations at high data rates, the UE typically includes a dedicated cellular modem. A cellular modem can be implemented as one or more integrated circuits, logically separated into a "baseband" processor and a "radio-frequency," or "RF," processor. The baseband processor handles operations such as segmentation, encoding, interleaving and rate matching, and scrambling for the uplink channels (and the reverse operations for the downlink channels), while the RF processor handles waveform generation and all analog operations.

Many types of UE are portable, battery-powered devices such as smart phones, tablets, wearable devices, and the like. For such devices, it is desirable to have a cellular modem that is area-efficient and power-efficient while supporting high data rates. In addition, to support mobility across a range of geographic areas where base stations supporting different standards may be available, it is also desirable that the same modem can support multiple cellular data communication specifications, e.g., both 4G and 5G.

SUMMARY

According to some embodiments, a cellular modem processor can include dedicated processing engines that implement specific, complex data processing operations. To implement operations such as PDSCH decoding, a cellular modem can include various pipelines of processing engines, where the processing engines include functional units that execute instructions corresponding to different steps in a sequence of operations. For instance, the functional units in a PDSCH decoding pipeline can include de-rate-matching, deshortening, and decoding functional units, load and store functional units to move data in and out of the pipeline, and so on. Flow control or data synchronization between instructions is provided using a hybrid of firmware-based flow control and hardware-based data dependency management. For instance, firmware instructions can define data flow by a sequence of instructions that provide input and output virtual addresses for operations, where the input and output virtual addresses are mapped to (physical) buffers in the pipeline such that different buffers have different virtual addresses. A hardware interlock controller within the pipeline can track and enforce the data dependencies for the pipeline based on the virtual addresses.

Some embodiments relate to a processing system including processing engines, buffers, a control processor and an interlock controller. The processing engines can include functional units configured to execute various instructions having input virtual addresses and output virtual addresses. For instance, a first processing engine can have a de-rate-matching functional unit configured to execute a de-rate-matching instruction; a second processing engine can have a deshortening functional unit configured to execute a deshortening instruction; and a third processing engine can have a decoder functional unit configured to execute a decode instruction. The buffers can be coupled to the plurality of processing engines and mapped to different virtual address in a virtual address space. The buffers can include a set of log likelihood ratio (LLR) buffers, a set of code block buffers, a set of decoder input buffers, and a set of decoder output buffers. The control processor can be coupled to the processing engines and configured to dispatch a sequence of instructions to the processing engines. The sequence of instructions can include a de-rate-matching instruction having an input virtual address that maps to a first one of the LLR buffers and an output virtual address that maps to a first one of the code block buffers, a deshortening instruction having an input virtual address that maps to the first one of the code block buffers and an output virtual address that maps to a first one of the decoder input buffers, and a decode instruction having an input virtual address that maps to the first of the decoder input buffers and an output virtual address that maps to a first one of the decoder output buffers. The interlock controller can be coupled to the plurality of processing engines and configured to manage data dependencies based on the input virtual addresses and the output virtual addresses of the instructions.

In some embodiments, the first processing engine, the second processing engine, and the third processing engine can include respective dispatch queues configured to queue one or more instructions; respective dispatch queue interfaces configured to receive, in order, the dispatched instructions from the control processor, to queue the dispatched instructions for execution in order, and to communicate a read-lock request for the input virtual address and a write-lock request for the output virtual address to the interlock controller; and respective instruction interfaces configured to communicate with the interlock controller to determine whether data dependencies for a next instruction queued in the dispatch queue are cleared, wherein the instruction interface initiates execution of the next instruction after the interlock controller indicates that the data dependencies are cleared.

In some embodiments, the third processing engine can also include a cyclic redundancy check (CRC) functional unit. The CRC functional unit can be pipelined with the decoder functional unit and configured to perform a CRC on a decoded code block generated by the decoder functional unit.

In some embodiments, the processing engines can also include a fourth processing engine that includes a first store functional unit configured to execute a store-output instruction having an input virtual address that maps to one of the decoder output buffers and a second store functional unit configured to execute a store hybrid automatic repeat request (HARQ) instruction having an input virtual address that maps to one of the code block buffers. The control processor can be further configured to determine whether a code block output by the decoder functional unit passed a cyclic redundancy check (CRC), to dispatch the store-output instruction when the code block output by the decoder functional unit passed the CRC, and to dispatch the store HARQ instruction when the code block output by the decoder functional unit did not pass the CRC. In some embodiments, the third processing engine further includes a CRC functional unit that is pipelined with the decoder functional unit and configured to perform the CRC on a set of decoded output bits generated by the decoder functional unit and to write a CRC result to a status register. The control processor can be configured to read the status register to determine whether the code block output by the decoder functional unit passed the CRC.

In some embodiments, the processing engines can include a fourth processing engine that includes a load functional unit configured to execute a load instruction having an input virtual address that maps to a shared memory and an output virtual address that maps to one of the LLR buffers. In some embodiments, the de-rate-matching functional unit can be configured to read source data from the one of the LLR buffers identified by the input virtual address, to generate updated data by combining the source data with existing data stored in the one of the code block buffers identified by the output virtual address and to write the updated data to the one of the code block buffers identified by the output virtual address. In some embodiments, the control processor can be configured to issue, for each of a number of chunks in a code block, the load instruction to the load functional unit, where the output virtual address of the load instruction is a chunk-dependent virtual address, followed by the de-rate-match instruction to the de-rate-matching functional unit, where for each chunk, the input virtual address of the de-rate-match instruction matches the output virtual address of the load instruction and the output virtual address of the de-rate match instruction is unchanged.

In some embodiments, the number of code block buffers can be greater than a number of processing engines in the plurality of processing engines, the number of LLR buffers can be exactly two LLR buffers, the number of decoder input buffers can be exactly two decoder input buffers, and the number of decoder output buffers can be exactly two decoder output buffers.

Some embodiments relate to a cellular modem processor having a plurality of processing pipelines including a first processing pipeline. The first processing pipeline can include processing engines, buffers, a control processor and an interlock controller. The processing engines can include functional units configured to execute various instructions having input virtual addresses and output virtual addresses. For instance, a first processing engine can have a de-rate-matching functional unit configured to execute a de-rate-matching instruction; a second processing engine can have a deshortening functional unit configured to execute a deshortening instruction; and a third processing engine can have a decoder functional unit configured to execute a decode instruction. The buffers can be coupled to the plurality of processing engines and mapped to different virtual address in a virtual address space. The buffers can include a set of log likelihood ratio (LLR) buffers, a set of code block buffers, a set of decoder input buffers, and a set of decoder output buffers. The control processor can be coupled to the processing engines and configured to dispatch a sequence of instructions to the processing engines. The sequence of instructions can include a de-rate-matching instruction having an input virtual address that maps to a first one of the LLR buffers and an output virtual address that maps to a first one of the code block buffers, a deshortening instruction having an input virtual address that maps to the first one of the code block buffers and an output virtual address that maps to a first one of the decoder input buffers, and a decode instruction having an input virtual address that maps to the first of the decoder input buffers and an output virtual address that maps to a first one of the decoder output buffers. The interlock controller can be coupled to the plurality of processing engines and configured to manage data dependencies based on the input virtual addresses and the output virtual addresses of the instructions.

In some embodiments, the first processing pipeline can be configured to decode physical downlink shared channel (PDSCH) data received via a 5G radio access network and a second processing pipeline can be configured to decode PDSCH data received via a 4G radio access network.

In some embodiments, the cellular modem processor can include a shared memory that is coupled to at least two of the processing pipelines, including the first processing pipeline. In some embodiments, the processing engines of the first processing pipeline can include a fourth processing engine that includes a load functional unit configured to execute a load instruction that loads data from the shared memory and an output virtual address that maps to one of the LLR buffers.

In some embodiments, the processing engines of the first processing pipeline can include a fourth processing engine that includes a first store functional unit configured to execute a store-output instruction having an input virtual address that maps to one of the decoder output buffers and a second store functional unit configured to execute a store hybrid automatic repeat request (HARD) instruction having an input virtual address that maps to one of the code block buffers.

Some embodiments relate to a method executed in a cellular modem processor having a decoding pipeline and a control processor. In some embodiments, the cellular modem processor can receive a transmit block for a physical downlink shared channel (PDSCH), the transmit block representing encoded data received via the PDSCH and including a number of code blocks. The control processor can dispatch a sequence of instructions to the decoding pipeline for at least a first one of the plurality of code blocks, where the sequence of instructions includes a de-rate-match instruction and a decode instruction, where the instructions specify one or both of an input virtual address or an output virtual address, where a virtual address space for the decoding pipeline is defined such that virtual addresses in the virtual address space map to different buffers in of a set of buffers in the decoding pipeline. The dispatched instructions can be received in respective dispatch queues in a plurality of processing engines in the decoding pipeline, where the processing engine in which a particular issued instruction is received includes a functional unit configured to execute the particular issued instruction. In response to receiving instructions, the processing engines can send a read-lock request for the input virtual address of the instruction and a write-lock request for the output virtual address of the instruction to an interlock controller of the decoding pipeline. Dispatched instructions can be issued from the dispatch queues to the functional units configured to execute the instructions. Instructions in a same one of the dispatch queues can be issued in order, and a next instruction is issued from a particular dispatch queue only after the interlock controller confirms, based on the input virtual address and the output virtual address, that data dependencies for the next instruction have been cleared. The issued instructions can be executed by the functional units, and executing an issued instruction can include one or both of reading from the buffer mapped to the input virtual address or writing to the buffer mapped to the output virtual address.

In some embodiments, the sequence of instructions for the code block can also include a load instruction to write data from a shared memory into one of the of buffers in the decoding pipeline, wherein an output virtual address of the load instruction specifies the one of the of buffers. In some embodiments, the code block can include multiple chunks, and issuing the sequence of instructions can include issuing, for each chunk in the code block, the load instruction, where the output virtual address of the load instruction is an chunk-dependent virtual address, followed by the de-rate-match instruction, where for each of the chunks, the input virtual address of the de-rate-match instruction matches the output virtual address of the load instruction and the output virtual address of the de-rate-match instruction is the same for each chunk.

In some embodiments, the control processor can be further configured such that a first instruction in the sequence of instructions is dispatched for a second one of the code blocks before a last instruction in the sequence of instructions for a first of the code blocks is executed.

In some embodiments, the sequence of instructions can include a load instruction to read data for the code block from an externally-shared memory, the load instruction having an output virtual address specifying a first one of the buffers as a destination for writing the data for the code block, where the load instruction is prior to the de-rate-match instruction and the decode instruction in the sequence; and a store instruction to write decoded data for the code block to the externally-shared memory, the store instruction having an input virtual address specifying a second one of the buffers as a source for the decoded data, where the store instruction is subsequent to the de-rate-match instruction and the decode instruction in the sequence. In some embodiments, the store instruction can be the only instruction in the sequence that writes data to the externally-shared memory.

The following detailed description, together with the accompanying drawings, will provide a better understanding of the nature and advantages of the claimed subject matter.

DETAILED DESCRIPTION

The following description of exemplary embodiments is presented for the purpose of illustration and description. It is not intended to be exhaustive or to limit the claimed embodiments to the precise form described, and persons skilled in the art will appreciate that many modifications and variations are possible. The embodiments have been chosen and described in order to best explain their principles and practical applications to thereby enable others skilled in the art to best make and use various embodiments and with various modifications as are suited to the particular use contemplated.

Figure 1:
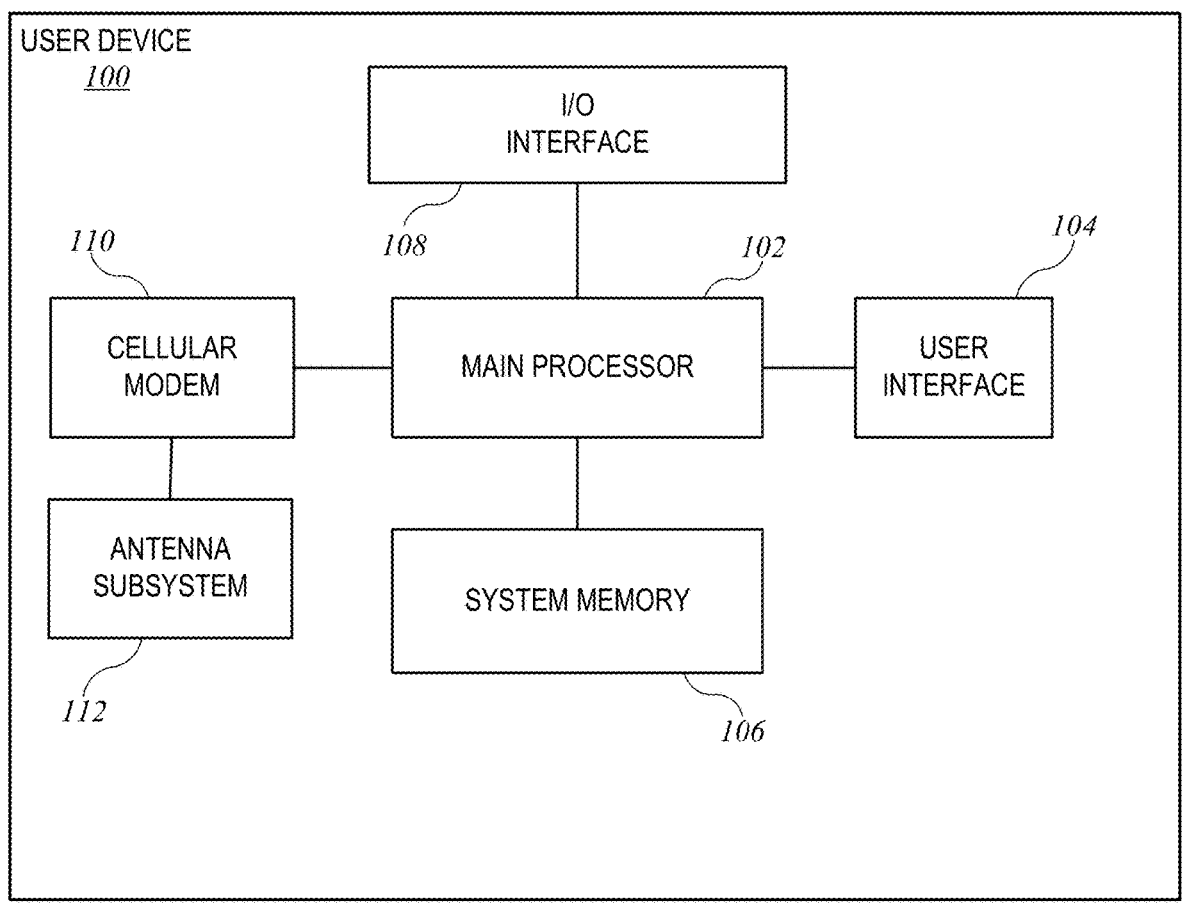
FIG. 1 is a simplified block diagram of a user device according to some embodiments.

FIG. 1 is a simplified block diagram of a user device 100 according to some embodiments. User device 100 can be, for example, a mobile device such as a smartphone, tablet computer, laptop computer, wearable device, or any other electronic device capable of operating as user equipment (UE) in a cellular radio access network. User device 100 is representative of a broad class of user-operable devices that may incorporate a cellular modem as described herein, and such devices can vary widely in capability, complexity, and form factor.

Main processor 102 can include, e.g., one or more single-core or multi-core microprocessors and/or microcontrollers executing program code to perform various functions associated with user device 100. For example, main processor 102 can execute an operating system and one or more application programs compatible with the operating system. In some instances, the program code may include instructions to send information to and/or receive information from other devices or systems, e.g., via a cellular data network such as a 4G or 5G network.

User interface 104 can include user-operable input components such as a touch pad, touch screen, scroll wheel, click wheel, dial, button, switch, keypad, keyboard, microphone, or the like, as well as output components such as a video screen, indicator lights, speakers, headphone jacks, haptic motors, or the like, together with supporting electronics (e.g., digital-to-analog or analog-to-digital converters, signal processors, or the like). Depending on the implementation of a particular user device 100, a user can operate input components of user interface 104 to invoke functionality of user device 100 and/or receive output from user device 100 via output components of user interface 104. In some embodiments, user device 100 may have a limited user interface (e.g., a small number of indicator lights and/or buttons) or no user interface.

System memory 106 can incorporate any type and combination of data storage media, including but not limited to random-access memory (e.g., DRAM, SRAM), flash memory, magnetic disk, optical storage media, or any other non-transitory storage medium, or a combination of media, and can include volatile and/or non-volatile media. System memory 106 can be used to store program code to be executed by main processor 102 and any other data or instructions that may be generated and/or used in the operation of user device 100.

Input/output (I/O) interface 108 can include hardware components and supporting software configured to allow user device 100 to communicate with other devices via point-to-point or local area network links. In some embodiments, I/O interface 108 can support short-range wireless communication (e.g., via Wi-Fi, Bluetooth, or other wireless transports) and can include appropriate transceiver and signal processing circuitry and software or firmware to control operation of the circuitry. Additionally or instead, in some embodiments, I/O interface 108 can support a wired connection to another device.

To enable communication via cellular networks, including cellular data communication, user device 100 can include a cellular modem 110 coupled to an antenna subsystem 112. Cellular modem 110 can be implemented as a microprocessor or microcontroller that acts as a co-processor to main processor 102. In some embodiments, cellular modem 110 and main processor 102 can be implemented as integrated circuits fabricated on a common substrate, e.g., as part of a system-on-a-chip design. Example implementations of cellular modem 110 are described below.

Antenna subsystem 112 can include an antenna, which can be implemented using a wire, metal traces, or any other structure capable of radiating radio-frequency (RF) electromagnetic fields and responding to RF electromagnetic fields at frequencies used in cellular data communication. For instance, 4G and 5G networks currently use various spectrum bands, including bands at 700 MHz, 850 MHz, 900 MHz, 1.5 GHz, 1.8 GHz, 2.1 GHz, 2.5 GHz and 3.5 GHz. Antenna subsystem 112 can also include circuitry to drive the antenna and circuitry to generate digital signals in response to received RF signals. A particular antenna implementation is not critical to understanding the present disclosure, and those skilled in the art will know of numerous implementations. In some embodiments, antenna subsystem 112 can be shared between cellular modem 110 and I/O interface 108; for instance, the same antenna can be used to support any combination of cellular, Wi-Fi, and/or Bluetooth communications.

User device 100 can also include other components not shown in FIG. 1. For example, in various embodiments, user device 100 can include one or more data storage devices using fixed or removable storage media; a global positioning system (GPS) and/or other global navigation satellite system (GNSS) receiver; a camera; a microphone; a speaker; a power supply (e.g., a battery); power management circuitry; any number of environmental sensors (e.g., temperature sensor, pressure sensor, accelerometer, chemical sensor, optical sensor, etc.); and so on. Accordingly, user device 100 can provide a variety of functions, some or all of which may be enhanced by or reliant on cellular data communication supported by cellular modem 110.

Figure 2:
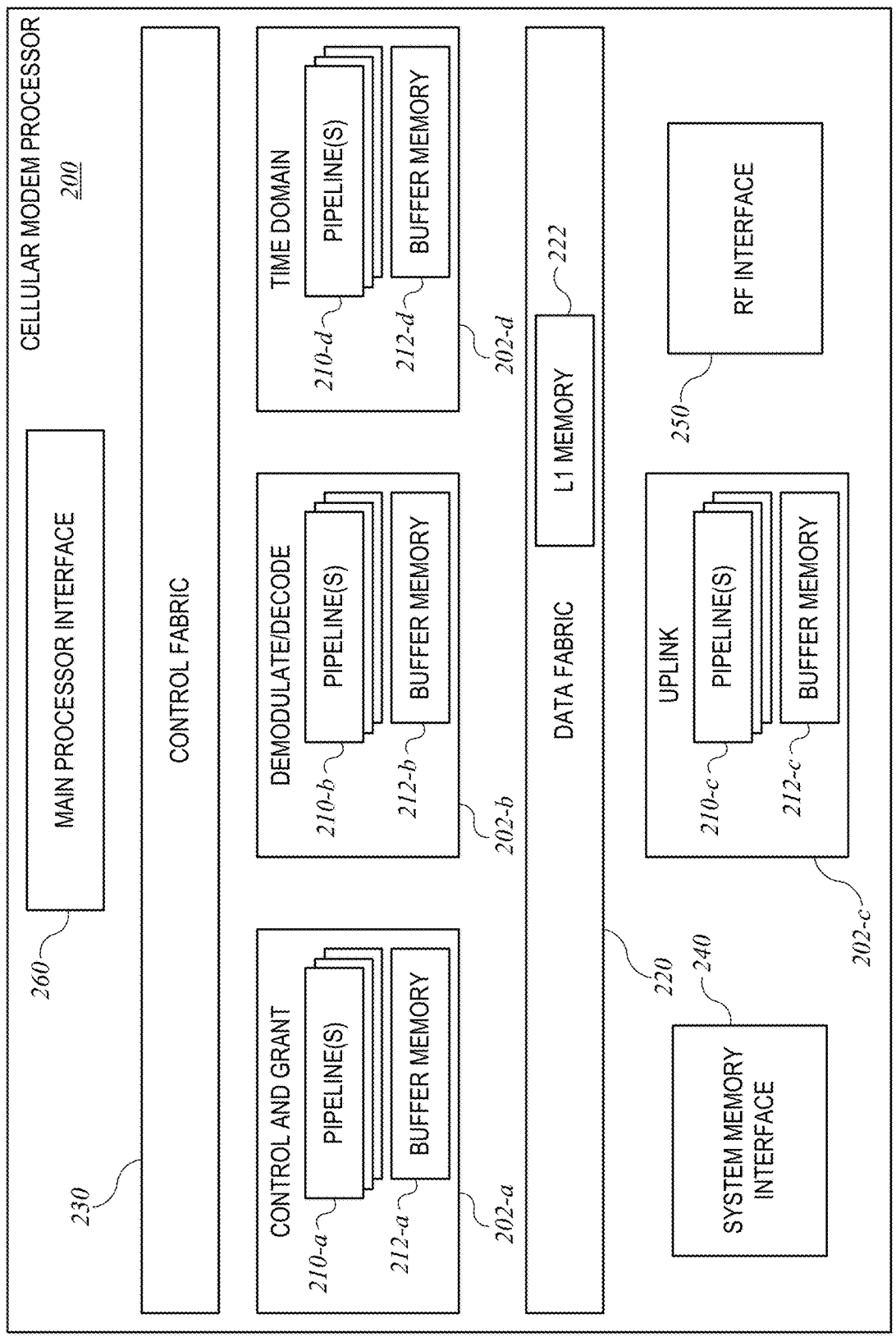
FIG. 2 is a simplified block diagram of a cellular modem processor according to some embodiments.

FIG. 2 is a simplified block diagram of a cellular modem processor 200 according to some embodiments. Cellular modem processor 200 can implement all or part of cellular modem 110 of FIG. 1. In various embodiments, cellular modem processor 200 can operate as user equipment (UE) in a cellular radio access network such as a 4G network and/or a 5G network.

Signal processing capabilities of cellular modem processor 200 can be implemented in various processing clusters 202. Each processing cluster 202 can include one or more pipelines 210 and dedicated buffer memory 212 (e.g., SRAM). Portions of buffer memory 212 can be allocated to each pipeline 210 with the processing cluster 202, so that different pipelines 210 need not share buffers. Each pipeline 210 can implement a particular sequence of operations associated with cellular data communication. For example, control and grant cluster 202-a can implement one or more pipelines 210-a for physical downlink control channel (PDCCH) processing for 4G and/or 5G networks. Information extracted from the control channel can be provided to other clusters, e.g., via data fabric 220. Demodulate/Decode (DMDC) cluster 202-b can implement one or more pipelines 210-b for physical downlink shared channel (PDSCH) processing for 4G and/or 5G networks. Uplink cluster 202-c can implement one or more pipelines 210-c for physical uplink control channel (PUCCH) processing and physical uplink shared channel (PUSCH) processing for 4G and/or 5G networks. Pipelines in control and grant cluster 202-a, DMDC cluster 202-b, and uplink cluster 202-c can operate in the frequency domain. Time domain cluster 202-d can implement one or more pipelines 210-d for conversion between time domain and frequency domain, which can include Fourier transforms and inverse Fourier transforms (e.g., using Fast Fourier Transform (FFT) or other discrete Fourier transform (DFT) algorithms).

Each pipeline 210 includes dedicated logic circuitry that implements a specific sequence of operations. The operations can conform to the specifications of a particular cellular data network, including 4G and/or 5G networks. For example, a PDSCH pipeline 210-b in DMDC cluster 202-b can implement frequency-domain signal processing operations for a 4G PDSCH channel, including orthogonal frequency division multiplexing (OFDM) symbol demapping, descrambling, de-interleaving, rate recovery, decoding using a Turbo decoder, and error detection and correction. Similarly, a separate PDSCH pipeline 210-b in DMDC cluster 202-b can implement frequency-domain signal processing operations for a 5G PDSCH channel, including descrambling, de-interleaving and rate recovery, decoding using a low-density parity check (LDPC) decoder, and error detection and correction. In some embodiments, at least one of PDSCH pipelines 210-b can be a configurable pipeline that handles both 4G and 5G PDSCH decoding. As another example, a PUCCH pipeline 210-c in uplink cluster 202-c can implement frequency-domain uplink processing for 4G PUCCH and PUSCH channels, including multiplexing of PUCCH and PUSCH data blocks. For example, a first pipeline can perform PUSCH encoding operations, including CRC (cyclic redundancy check) calculation, Turbo encoding, interleaving of encoded subblocks, and rate matching, while a second pipeline can perform PUCCH encoding operations, including CRC calculation, convolutional encoding, interleaving of encoded subblocks, and rate matching. A downstream pipeline can receive the rate-matched outputs of the first and second pipelines and multiplex the data into a single data stream for transmission, then scramble the data. The output can be mapped to a sequence of OFDM symbols for transmission. As these examples illustrate, each pipeline 210 can implement complex operations, and different pipelines 210 can implement disparate operations. In some instances, a cluster 202 can include multiple copies of the same pipeline 210, which can operate in parallel on different portions of a data stream to support higher throughput. Additionally or instead, a cluster 202 can include multiple different pipelines 210. For instance, in some embodiments, DMDC cluster 202-b can have one pipeline dedicated to 4G PDSCH processing and two copies of a shared pipeline that can be reconfigured for 4G or 5G PDSCH processing. Additional examples of pipelines and signal processing operations are described below.

As noted above, each pipeline 210 can have its own buffers 212 to store data as it progresses through the pipeline. To facilitate sharing of data between different pipelines 210 and different clusters 202, a data fabric 200 including a memory 222 local to cellular modem processor (referred to as "L1 memory") can be provided. Data fabric 200 can include memory circuits (e.g., SRAM, DRAM, or the like) implementing L1 memory 222, a read interface and a write interface connected via crossbars to clusters 202, and arbitration logic to manage multiple requests (e.g., using time division multiplexing or other techniques). In some embodiments, data fabric 200 can be implemented such that any cluster 202 can access any location in L1 memory 222. A particular memory or data fabric architecture is not critical to understanding the present disclosure, and a variety of architectures, including conventional architectures, can be used. In some embodiments, L1 memory 222 can be used to transfer data into and out of pipelines 210. For example, as described below, each pipeline 210 can include a first stage (or processing engine) that reads input data from L1 memory 222 and a final stage (or processing engine) that writes output data to L1 memory 222.

Control fabric 230 can include circuitry implementing communication between clusters 202 and/or between cellular modem processor 200 and other components of a device or system (e.g., user device 100 of FIG. 1) in which cellular modem processor 200 operates. For example, control fabric 230 can support messages from uplink cluster 202-c to time domain cluster 202-d indicating when uplink data is ready for conversion to time domain and transmission, messages from time domain cluster 202-d to DMDC cluster 202-b and/or control and grant cluster 202-a indicating when downlink data has been received and is ready for decoding. Any other messages or control signals to coordinate operations across different clusters or other components can be supported via control fabric 230. A particular control architecture is not critical to understanding the present disclosure, and a variety of architectures, including conventional architectures, can be used.

Cellular modem processor 200 can also include interfaces to other components of a system (e.g., user device 100 of FIG. 1) within which cellular modem processor 200 operates. For instance, a system memory interface 240 can provide a direct memory access (DMA) interface to transfer data between L1 memory 222 and system memory 106 of FIG. 1, including data for transmission via PUSCH and data received via PDSCH. RF interface 250 can transfer data to and from antenna subsystem 112 (e.g., as a digital data stream that is converted to or from an analog waveform by antenna subsystem 112). Main processor interface 260 can communicate with main processor 102, via an interface such as Advanced eXtensible Interface (AXI), which is part of ARM Advanced Microcontroller Bus Architecture or any other suitable interface for communication between a main processor and a coprocessor. System memory interface 240, RF interface 250, and main processor interface 260 can be coupled via control fabric 230 to other elements within cellular modem processor 200.

It will be appreciated that cellular modem processor 200 is illustrative and that variations and modifications are possible. A cellular modem processor can include any number and combination of clusters and pipelines, supporting any number and combination of cellular data communication standards. Data and control fabrics can be varied as desired. In some embodiments, cellular modem processor 200 can have a high throughput to support high-speed cellular networks (e.g., 12 Gbps for a 5G network).

To provide high throughput, a cellular modem processor can include a number of pipelines, where each pipeline can include a number of dedicated circuits configured to perform specific operations associated with data communication; examples include encoding, decoding, interleaving, rate matching, de-interleaving, de-rate-matching, computing cyclic redundancy check (CRC) bits, performing CRC, and so on. In some embodiments, some or all of the pipelines can be implemented using a general architectural framework that provides flexible (firmware-based) control with a data synchronization mechanism that is independent of the particular functionality of a pipeline or pipeline stage.

Figure 3:
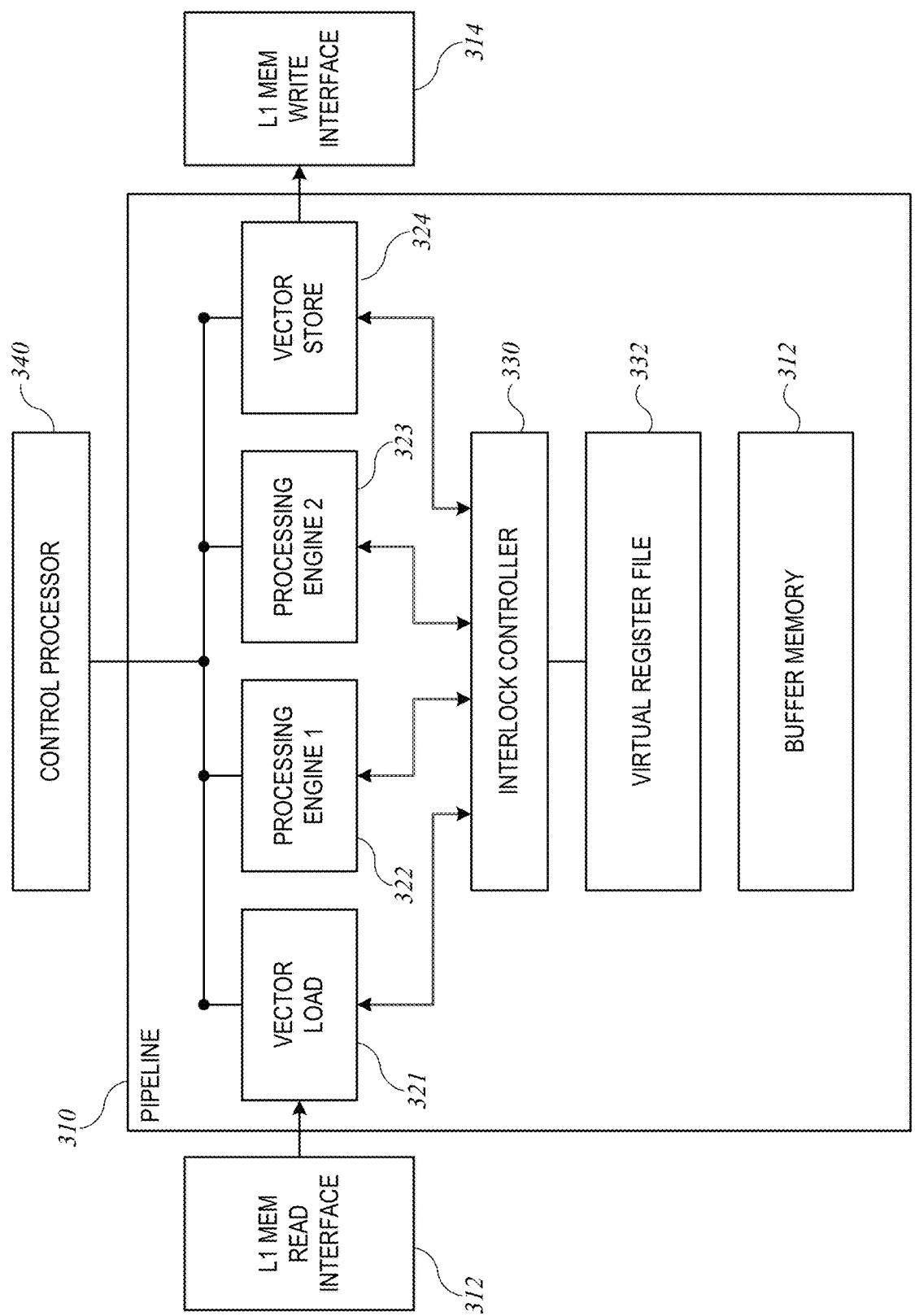
FIG. 3 shows a simplified block diagram of an architecture for a pipeline for a processor according to some embodiments.

FIG. 3 shows a simplified block diagram of an architecture for a pipeline 310 for a processor such as cellular modem processor 200 according to some embodiments. Pipeline 310 is presented as a generalized architectural model that can be used to provide data synchronization (or flow control) in a variety of signal processing or other data processing pipelines, including any or all of the pipelines 210 in cellular modem processor 200. In some embodiments, pipeline 310 can be a vector pipeline that can execute single-instruction multiple-data (SIMD) instructions to increase parallelism. Pipeline 310 includes a number of processing engines. In this example, the processing engines include vector load engine 321, two intermediate processing engines 322, 323, and a vector store engine 324. Vector load engine 321 communicates with a read interface 312 to read data stored in L1 memory (e.g., L1 memory 222 shown in FIG. 2) into a buffer memory 312 that is local to pipeline 310. In some embodiments, vector load engine 321 may also perform other operations on data read from L1 memory. For example, where pipeline 310 implements a PDSCH processing pipeline, vector load engine 321 may perform descrambling of data read from L1 memory prior to writing the data to buffer memory 312. Intermediate processing engine 322 can perform further operations on the data written to buffer memory 312 by vector load engine 321 and can write back the results of such operations to buffer memory 312. Similarly, intermediate processing engine 323 can perform further operations on the data written to buffer memory 312 by intermediate processing engine 322 and can write back the results of such operations to buffer memory 312. Although two intermediate processing engines are shown, it should be understood that any number of intermediate processing engines can be included in a pipeline. Vector store engine 324 can communicate with a write interface 314 to L1 memory (e.g., L1 memory 222 shown in FIG. 2). For example, vector store engine 324 can read the data written to buffer memory 312 by intermediate processing engine 323 (the last intermediate processing engine) and write the data to L1 memory. In some embodiments, vector store engine 324 may also perform other operations on data read from buffer memory 312 prior to writing the data to L1 memory. Each processing engine 321-324 can include logic circuits implementing specific functions related to cellular data processing. For example, in a PDSCH pipeline, the processing engines can include processing engines that perform descrambling, deinterleaving and rate recovery, decoding, and error detection and correction.

Processing engines 321-324 can operate as stages of a pipeline, with later stages operating on the output of earlier stages. Due to data dependencies between stages, processing engines 321-324 generally do not operate on the same data set at the same time. However, pipeline 310 can be operated as a multithreaded pipeline, in which different processing engines operate concurrently on different, independent data sets. For example, intermediate processing engine 322 can operate on a first data set while vector load engine 321 is loading a second data set. A thread can be defined corresponding to each data set. Each thread can have an associated context. For instance, for LDPC encoding, different threads can use different base graphs, code block sizes, etc. Each of processing engines 321-324 can include parameter registers that store parameter values defining the current context for that processing engine; when threads are switched, new parameter values can be loaded into the parameter registers.

Each processing engine 321-324 can implement a complex operation (e.g., LDPC decoding) that may take many clock cycles to complete. Operations implemented in different processing engines in the same pipeline may take different amounts of time to complete, and in some instances, an operation may take a variable amount of time, e.g., depending on parameter values of thread. Accordingly, pipeline 310 can benefit from data synchronization (or flow control) between processing engines 321-324 to ensure that data for a particular operation is written to buffer 312 by an upstream processing engine before a downstream processing engine attempts to read it.

According to some embodiments, data synchronization in a pipeline such as pipeline 310 can be provided using a combination of firmware-based control and a hardware-based interlock mechanism that can be independent of the particular operations implemented in the pipeline. For example, pipeline 310 can be controlled by a control processor 340. Control processor 340 can be, e.g., a scalar or superscalar microprocessor that implements an instruction set architecture (ISA) such as the x86 ISA originally developed by Intel and the related x86-64 ISA developed by AMD and Intel, ARM and AArch64 ISA from ARM Holdings, Power ISA and PowerPC ISA from IBM/Motorola, RISC-V or other ISA, including a customized ISA. Accordingly, control processor 340 can include conventional microprocessor components, such as an instruction memory and associated circuitry to fetch and decode instructions and to dispatch instructions to processing engines or functional units for execution. In some embodiments, control processor 340 can include functional units such as a general-purpose ALU, to which some instructions (e.g., add, compare, etc.) can be dispatched.

The ISA supported by control processor 340 can define a subset of instructions that control processor 340 dispatches to pipeline 310, e.g., to specific processing engines 321-324 of pipeline 310. For example, a specific instruction can be defined that is dispatched for execution by one of processing engines 321-324 in pipeline 310 for the purpose of performing an encoding process, such as LDPC encoding. The instructions dispatched to pipeline 310 can be vector (SIMD) instructions, regardless of whether control processor 340 is a vector processor. In some instances, the instructions dispatched to the pipeline can include context (thread-specific) parameters, such as address range(s) within buffer 312 for reading and/or writing data, as well as other parameters specifying aspects of the operation to be performed (e.g., rate-matching parameters, code block sizes for encoding or decoding, and so on). In addition or instead, the ISA can define parameter-setting instructions that provide some or all of the context parameters for a thread to pipeline 310.

Program code to be executed by control processor 340 can be provided as firmware. For instance, an instruction storage memory of control processor 340 can be loaded with code during installation or upgrading of a user device (e.g., user device 100), and control processor 340 can execute the firmware code.

The order of instructions in the program code can (implicitly) define data dependencies. For instance, if an instruction to write to a particular memory location in buffer memory 312 precedes an instruction to read from that location, a read-after-write dependency is defined. If an instruction to read from a particular memory location in buffer memory 312 precedes an instruction to write to that location, a write-after-read dependency is defined. If two different instructions specify writing to the same location in buffer memory 312, a write-after-write dependency is defined. If instructions having data dependencies are not executed in order relative to each other, the wrong data may be read, resulting in incorrect output data. In some embodiments, control processor 340 issues all instructions in-order, which can facilitate identifying data dependencies within pipeline 310. In some instances, a data dependency can exist between instructions to different processing engines 321-324. For instance, within a thread, processing engine 323 may operate on output data from processing engine 322, which involves a read-after-write dependency. Where data dependencies between processing engines exist, the later processing engine (e.g., processing engine 323) should wait to begin reading its input data until the earlier processing engine (e.g., processing engine 322) has finished writing its output data.

To manage data dependencies between processing engines 321-324, pipeline 310 can include an interlock controller 330. Interlock controller 330 can be a special-purpose logic circuit and can have associated memory that implements a virtual register file 332. For example, virtual register file 332 can be implemented using a lookup table or other addressable memory structure. (It should be understood that, as used herein, the term "virtual register file" refers to a physical memory structure. As described below, the physical memory structure can be used to store data dependency information based on references to virtual addresses.) As described below interlock controller 330 can use virtual register file 332 to track data dependencies and determine when data dependencies are cleared such that a particular processing engine can execute a particular instruction. For example, upon receipt of a dispatched instruction from control processor 340, any of processing engines 321-324 can send a read-lock request specifying an input address range (which can be defined in a virtual address space) and/or a write-lock request specifying an output address range (which can be defined in the same virtual address space) to interlock controller 330. Interlock controller 330 can update virtual register file 332 to establish the read-lock and write-lock on the specified addresses, e.g., by adding a read-lock or write-lock indicator to a list of locks associated with that address. Upon completion of an instruction (or a read or write operation associated with the instruction), the processing engine can send a clear-lock request specifying which read-lock or write-lock is to be cleared, and interlock controller 330 can update virtual register file 332 to clear the read-lock or write-lock. Prior to executing an instruction, processing engines 321-324 can poll interlock controller 330 using the relevant virtual addresses, and interlock controller 330 can respond with a "grant" signal if the polled virtual address is clear of data dependencies and a "deny" signal if not. Processing engines 321-324 can wait to execute the instruction (while continuing to poll interlock controller 330) until the grant signal is received from interlock controller 330. Accordingly, interlock controller 330 can provide data synchronization between processing engines 321-324 in pipeline 310.

It should be noted that operation of interlock controller 330 can be independent of the particular operations performed by any of the processing engines or how long a given operation might take. As long as each processing engine provides read-lock and write-lock requests on receipt of an instruction and defers execution until the grant signal is received, interlock controller 330 can manage the data dependencies.

Figure 4:
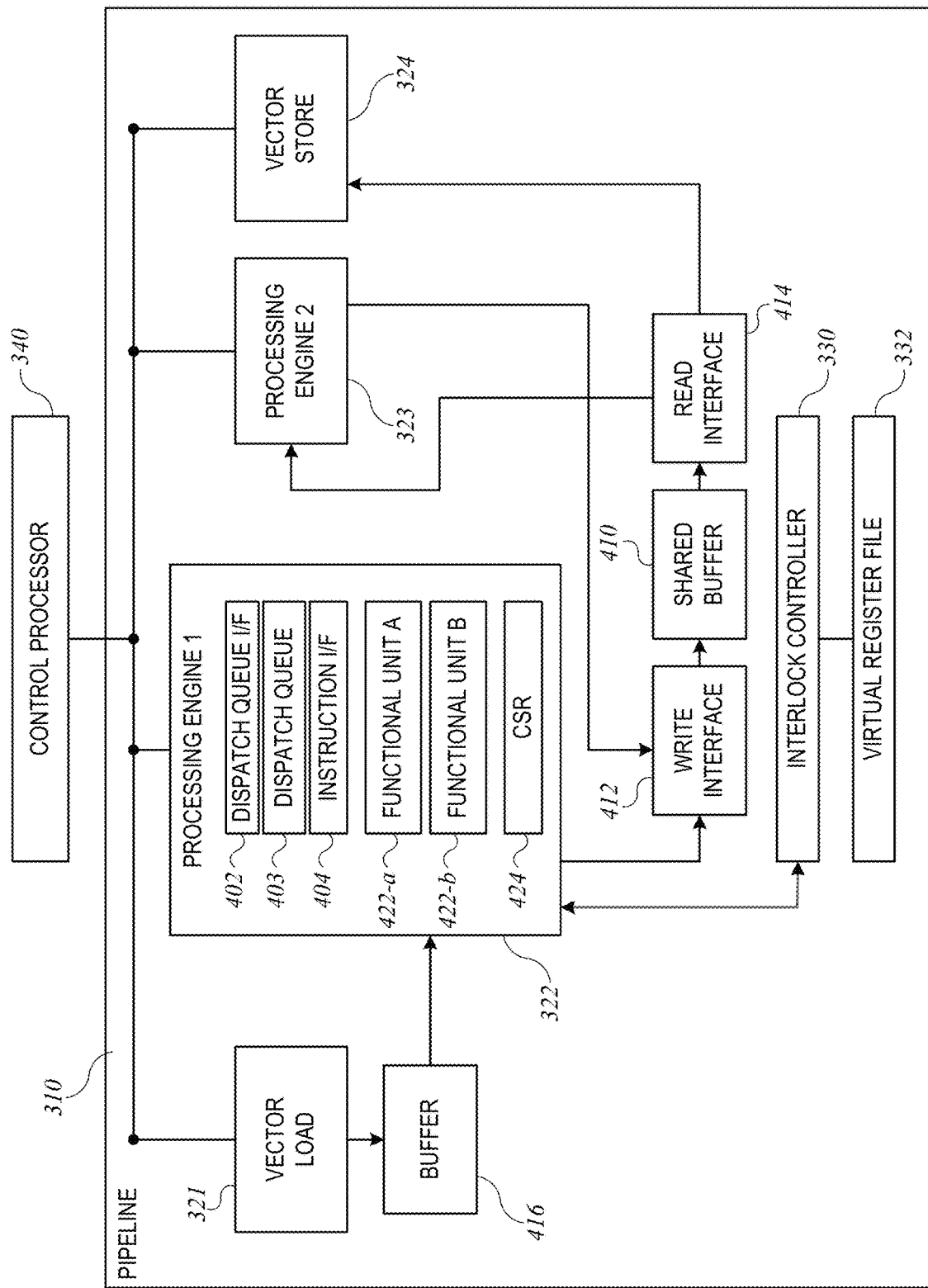
FIG. 4 shows a more detailed block diagram of the pipeline of FIG. 3 according to some embodiments.

In some embodiments, each processing engine 321-324 can use a uniform interface to communicate with control processor 340 and interlock controller 330. FIG. 4 shows a more detailed block diagram of pipeline 310 according to some embodiments. As described above, pipeline 310 includes a set of processing engines including vector load engine 321, intermediate processing engines 322-323, and vector store engine 324. Also shown in FIG. 4 are components of a representative processing engine 322. (It should be understood that other processing engines can include similar components.) Processing engine 322 can include a dispatch queue interface 402, a dispatch queue 403, an instruction interface 404, and one or more functional units 422 (two functional units 422-a and 422-b are shown; in general, a processing engine can have one or more functional units). Each functional unit 422 can be implemented as a vector (SIMD) functional unit that includes dedicated logic circuitry configured to execute an instruction (or operation) on multiple inputs in parallel. The instruction can be of arbitrary complexity. For example, a PDSCH processing pipeline that supports both 4G and 5G networks can include an instance of processing engine 322 that performs decoding. In this case, functional unit 422-a can implement Turbo decoding for 4G networks while functional unit 422-b implements LDPC decoding for 5G networks. Whether Turbo decoding or LDPC decoding is performed for a particular block of data can be determined by the instructions from control processor 340. For example, there can be a specific instruction that invokes functional unit 422-a and a different specific instruction that invokes functional unit 422-b. Each functional unit 422 can also include registers to store data during instruction execution and/or parameters that control the instruction execution. It should be understood that each functional unit 422 is a distinct physical circuit; different functional units 422 do not share components. Similarly, each processing engine 321-324 is a distinct physical circuit.

It should be understood that pipeline 310 and/or components thereof (e.g., processing engines 322) can include additional components. For example, processing engine 322 (or any processing engine in pipeline 310) can include control and status registers (CSRs) 424 that store information about received and/or executed instructions, data registers, and/or other internal registers that are not shared with other processing engines. In some embodiments, CSRs and/or other internal registers of a processing engine can be read or written by control processor 340. For example, control processor 340 can dispatch an instruction to a processing engine to read from or write to a particular CSR. In some embodiments, both blocking reads and non-blocking reads are supported. Register-read and register-write instructions can be queued in dispatch queue 403 by dispatch queue interface 402 and executed in order with other instructions to the same processing engine. In some embodiments, the internal registers of a processing engine (e.g., processing engine 322) are not shared between processing engines, and when a register-read or register-write instruction reaches the front of dispatch queue 403, it can be executed without polling interlock controller 330. In some embodiments, execution of the register-access instruction may wait until execution of any preceding instructions has completed. Vector status registers and vector flag registers can be implemented in a similar manner. Those skilled in the art with access to the present disclosure will be able to provide an appropriate set of status registers and/or flag registers and associated logic circuits to support execution of instructions using pipeline 310 and control processor 340. In various embodiments, any register that is shared between two or more processing engines can have a virtual address that allows interlock controller 330 to manage data dependencies for that register, while any register that is used by only one processing engine might or might not have a virtual address, depending on implementation.

As described above with reference to FIG. 3, data can be communicated between processing engines 321-324 using buffers 312 that are local to pipeline 310. In some instances, a buffer may be dedicated to a pair of successive processing engines in the pipeline. For example, FIG. 4 shows a dedicated buffer 416 to which vector load engine 321 writes data and from which intermediate processing engine 322 reads data. In other instances, a buffer may be shared by more than two processing engines in the pipeline. For example, FIG. 4 shows a shared buffer 410 having a write interface 412 and a read interface 414. Intermediate processing engines 322 and 323 each write data to shared buffer 410, and intermediate processing engine 323 and vector store engine 324 each read data from shared buffer 410. Write interface 412 and read interface 414 can implement crossbars and arbitration schemes such that any processing engine 321-324 (or any subset of processing engines 321-324) in pipeline 310 can read to or write from any location in shared buffer 410. Within a particular pipeline 310, any combination of shared buffers 410 and dedicated buffers 416 can be used, and within a given cellular modem processor (e.g., processor 200), different pipelines can have different configurations of buffers. A pipeline address space can be defined within each pipeline such that each location in buffers 416 and 410 (and/or any other buffers present in the pipeline) has a unique address. In some embodiments the pipeline address space can be a virtual address space that translates, or maps, to physical locations in buffers 416, 410 via a simple operation (e.g., the virtual address can be a physical address with a buffer identifier prepended or the virtual address can be identical to the physical address); a variety of mappings between virtual and physical addresses can be used, provided that each virtual address maps to a different physical location in the buffer(s) of the pipeline. In some embodiments, the virtual address space can also include virtual addresses representing other locations in addition to buffers in the pipeline. For example, virtual addresses in the virtual address space can be defined for locations in L1 memory (or any shared memory) and/or for internal registers within a processing engine (e.g., any or all of processing engines 322) such as CSRs 424, internal data registers, or any other register or data storage location in pipeline 310.

Operation of functional units 422 can be controlled by dispatch queue interface 402, dispatch queue 403, and instruction interface 404. Dispatch queue interface 402 can receive instructions dispatched from control processor 340 for execution by processing engine 322. Dispatch queue 403 can be a memory structure, such as a FIFO buffer, that can maintain a queue of instructions received from control processor 340 until they can be executed (in order) by functional units 422. The depth of dispatch queue 403 is a matter of design choice, and in various embodiments, dispatch queue 403 can hold one, two, or more instructions. Dispatch queue interface 402 can also include circuitry to add instructions to dispatch queue 403 and additional circuitry to communicate with interlock controller 330 to send read-lock and write-lock requests as new instructions are received by dispatch queue interface 402. Instruction interface 404 can include circuitry to read the oldest instruction in dispatch queue 403, communicate with interlock controller 330 (e.g., by polling) to determine when data dependencies for the oldest instruction in dispatch queue 403 are satisfied, and launch the instruction in the appropriate functional unit 422 when data dependencies are satisfied. Examples of operation of dispatch queue interface 402 and instruction interface 404 are described below.

Figure 5:
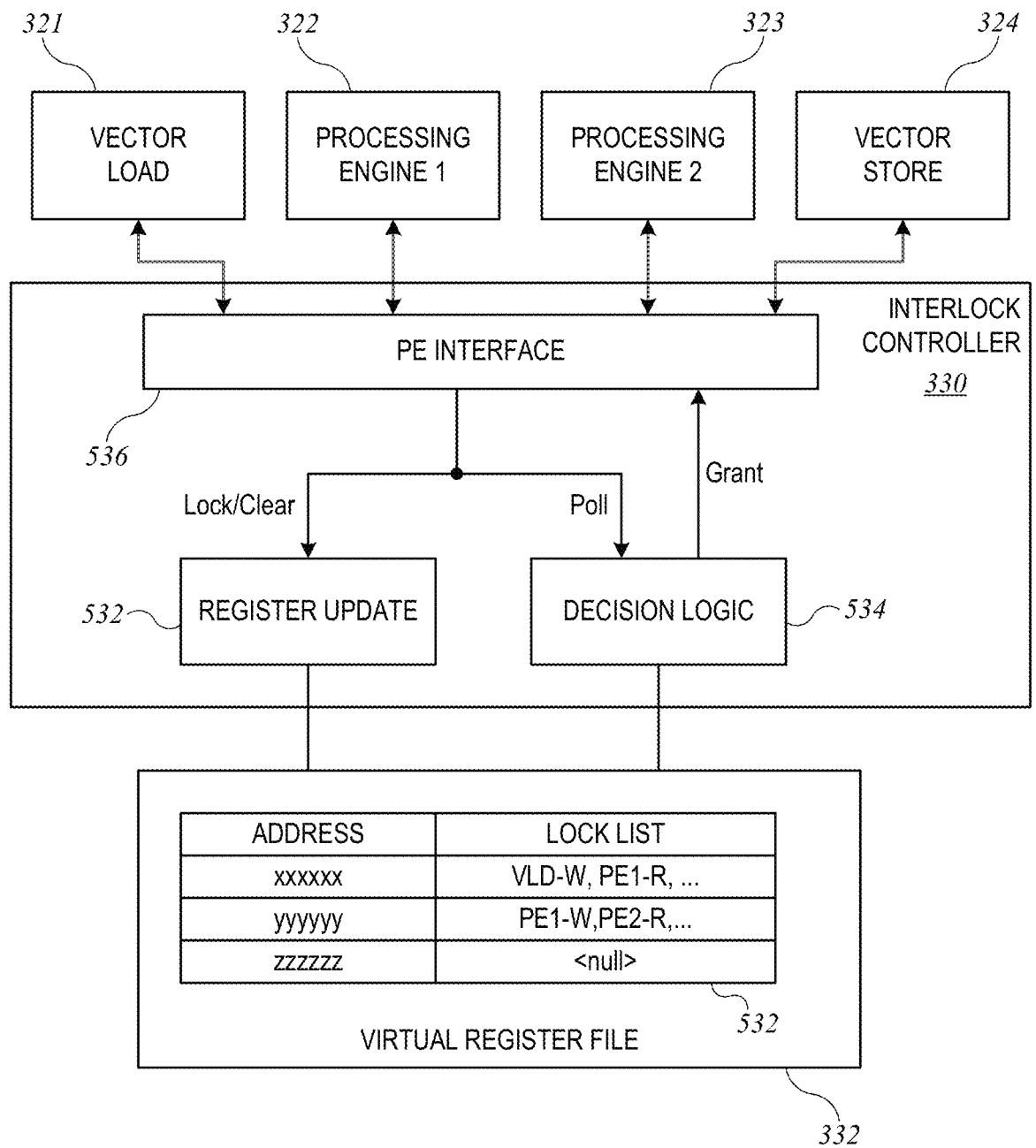
FIG. 5 is a simplified block diagram showing additional details of an interlock controller for a pipeline according to some embodiments.

Interlock controller 330 can receive and respond to requests from processing engines 321-324. FIG. 5 is a simplified block diagram showing additional details of interlock controller 330 according to some embodiments. Interlock controller 330 can include a register update circuit 532 and a decision logic circuit 534, as well as an interface 536 to processing engines 321-324. In this example, four processing engines are present. It should be understood that any number of processing engines can be included in a pipeline, and that all processing engines in the same pipeline can communicate with the same interlock controller. Interlock controller 330 can maintain a virtual register file 332. As shown in FIG. 5, virtual register file 332 can include a data structure 532 (e.g., a lookup table) that tracks the status of each address in the pipeline address space. For instance, for each address or range of addresses in the pipeline (virtual) address space, data structure 532 can store information indicating whether any read-lock and/or write-lock is currently established and if so by which processing engine(s). In some embodiments, data structure 532 can store a list associated with an address or range of addresses that lists, in order of receipt, all read-locks and write-locks that have been received and not cleared.

Via interface 536, interlock controller 330 can receive requests from processing engines 321-324, including "Lock," "Clear," and "Poll" requests, and can send responses to processing engines 321-324, including "Grant" and "Deny" responses. In some embodiments, "Lock" and "Clear" requests are handled by register update circuit 532, while "Poll" requests are handled by decision logic 534. For instance, register update circuit 532 can update the contents of data structure 532 in response to each "Lock" or "Clear" request. The "Lock" request can specify a virtual address range to be locked (as used herein, an "address range" can encompass any amount of memory, including a single address) and whether the lock is a read-lock or write-lock. A read-lock indicates that the processing engine will read from the buffer location(s) corresponding to the virtual address range, and a write-lock indicates that the processing engine will write to the buffer location(s) corresponding to the virtual address range. A "Clear" request indicates that a read-lock or write-lock can be cleared; the request can specify the address range and type of lock (read-lock or write-lock) to be cleared. As each request is received, register update circuit 532 can update data structure 532 accordingly. In some embodiments, register update circuit 532 can send an acknowledgement ("Ack") response to the processing engine after updating data structure 532.

It should be understood that the address ranges of different "Lock" and "Clear" requests from different processing engines can overlap without exactly coinciding. For example, different processing engines within a pipeline may operate on different-sized blocks or chunks of data. Thus, for instance, in pipeline 310 of FIGS. 3 and 4, vector load engine 321 may write-lock a large address range for a single instruction while intermediate processing engine 322 read-locks a subset of that address range for each instruction. In some embodiments, data structure 532 can have sufficient granularity to track the status of each address in the virtual address space; a coarser granularity (e.g., rows or pages) can be used if desired. In some embodiments, the granularity can be selected based on the smallest size of data blocks handled by the processing engines.

A "Poll" request can be sent by a processing engine when it is ready to execute the next instruction in its dispatch queue. Each "Poll" request can identify a virtual address range and an operation (read or write) to be performed. Decision logic 534 can read data structure 532 using the virtual address range to determine whether all data dependencies for that address range have been satisfied, based on presence or absence of read-locks and write-locks. A specific example of decision logic is described below. If all data dependencies have been satisfied, decision logic 432 can send a "Grant" response to the processing engine that sent the "Poll" request; if not, decision logic 432 can send a "Deny" response.

In some embodiments, each message from a processing engine can include the processing engine identifier; alternatively, each processing engine 321-324 can be connected to a different (physical) port of interface 536 (shown in FIG. 5), and the port identifier can be used to identify the processing engine. Other implementations are also possible, provided that virtual register file 332 indicates which addresses have read-lock and/or write-lock established, and by which processing engines.

In some embodiments, processing engine interface 536 can implement arbitration logic to prioritize requests that may be received on the same clock cycle. For example, arbitration logic can prioritize requests according to a sequence assigned to processing engines in the pipeline (e.g., an upstream processing engine can be prioritized over a downstream processing engine), or a round-robin prioritization logic can be used. In some embodiments, time-division multiplexing (TDM) can be used, with each processing engine being assigned certain clock cycles during which its requests to interlock controller 330 will be serviced. TDM can be implemented, e.g., by including timing logic in each processing engine to determine when the processing engine sends requests or by providing buffers in interface 536 to store requests from different processing engines and to select a next request in a round-robin fashion. A variety of arbitration schemes can be used.

It will be appreciated that pipeline 310 is illustrative and that variations and modifications are possible. Any number of processing engines can be included in a pipeline, and a processing engine can implement any operation, including operations related to 4G and/or 5G data processing. The virtual address space can be defined as desired. The dispatch queue of a processing engine can hold any number of entries (one or more), and dispatch queues of different processing engines can have different depths. A processing engine can include one or more functional units; where multiple functional units are present, each functional unit can have a different associated instruction.

In some embodiments, a processing engine can include multiple functional units that execute sequential operations, and the processing engine can include a hardware sequencer to control sequencing of the operations in different functional units. The hardware sequencer can include an instance of interlock controller 330 and virtual register file 332 that is local to one processing engine. In other words, any processing engine within a pipeline such as pipeline 310 can implement a "sub-pipeline," and multiple sub-pipelines can be present within a given pipeline. Where a processing engine implements a sub-pipeline, the control processor (e.g., control processor 340) can just dispatch an instruction for the sub-pipeline, and the processing engine can be configured to execute all stages of the sub-pipeline successively in response to the instruction.

Figure 6:
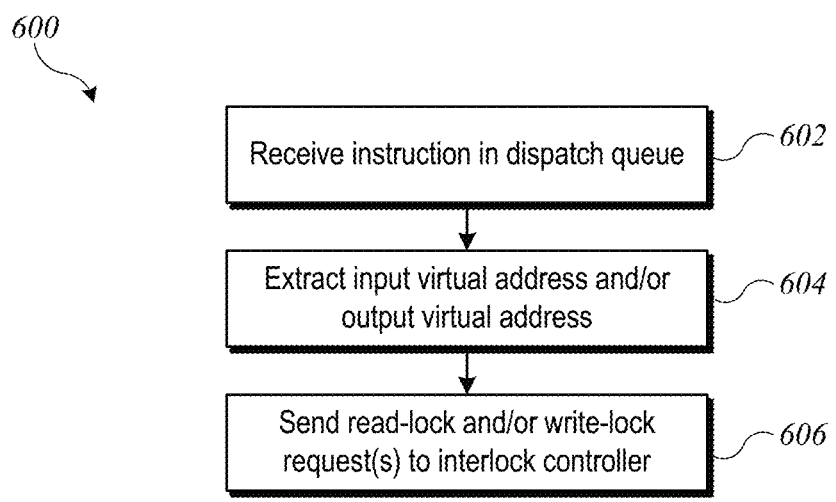
FIG. 6 shows a process that can be performed when an instruction is received into a processing engine according to some embodiments.
Figure 7:
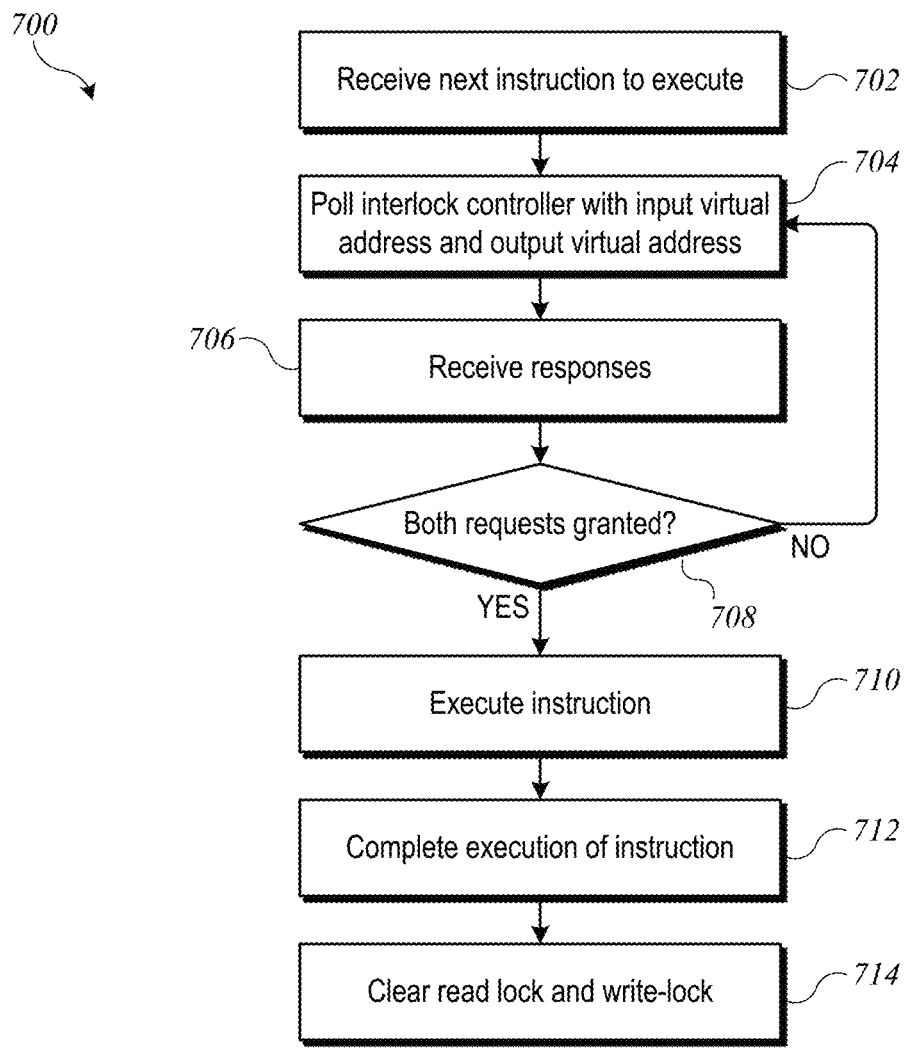
FIG. 7 shows a flow diagram of a process for executing an instruction in a processing engine according to some embodiments.
Figure 8:
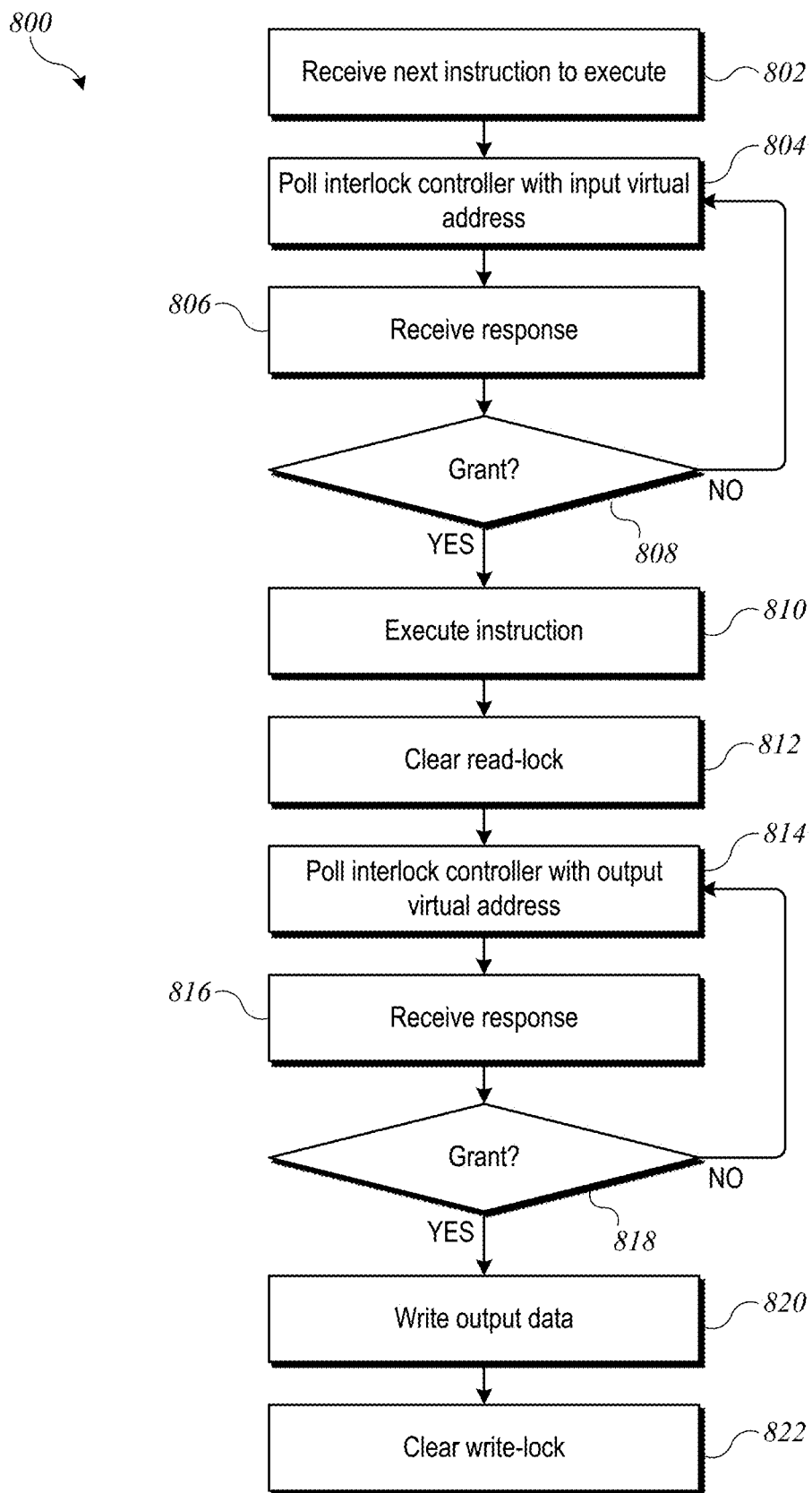
FIG. 8 shows a flow diagram of another process for executing an instruction in a processing engine according to some embodiments.

Examples of specific data synchronization operations that can be implemented within a pipeline (e.g., pipeline 310) using an interlock controller (e.g., interlock controller 330) will now be described. FIGS. 6, 7, and 8 show flow-control operations that can be implemented in each processing engine of a pipeline according to some embodiments. For instance, the operations shown can be implemented in each processing engine 321-324 of pipeline 310. FIG. 6 shows a process 600 that can be performed when an instruction is received by a processing engine according to some embodiments. Process 600 can be implemented, e.g., in dispatch queue interface 402 of each processing engine 321-324. At block 602, a new instruction is received at dispatch queue interface 402, e.g., from control processor 340 as described above. The new instruction can be added to dispatch queue 403 as it is received. At block 604, an input (read) virtual address range and an output (write) virtual address range can be extracted from the instruction. At block 606, a read-lock request for the input virtual address range and a write-lock request for the output virtual address range can be sent to interlock controller 330. Processing of the read-lock and write-lock requests by interlock controller 330 is described below. It should be understood that some instructions may result in generating only a read-lock request or only a write-lock request. For example, a "Load" instruction issued to vector load engine 321 can specify a read address range in the L1 memory space (which can be inside or outside the pipeline's virtual address space as desired) and a write virtual address that is in the pipeline's virtual address space; conversely, a vector-store instruction issued to vector store engine 324 can specify a read address range that is in the pipeline's virtual address space and a write address range in the L1 memory space (which, again, can be inside or outside the pipeline's virtual address space). In some embodiments, any input (or output) address that is outside the pipeline's buffers does not result in generating a read-lock (or write-lock) request. Thus, in some embodiments where the L1 memory space is not represented in the pipeline's virtual address space, a vector-load instruction can result in generating a write-lock request but not a read-lock request, while a vector-store instruction can result in generating a read-lock request but not a write-lock request. Where the L1 memory space is represented in the pipeline's virtual address space, a vector-load or vector-store instruction can generate both a read-lock request and a write-lock request. Where the L1 memory space is represented in the pipeline's virtual address space, the interlock controller can manage L1-memory data dependencies between instructions (e.g., load and store instructions) within the pipeline. As described above, L1 memory can be shared among multiple pipelines, and the L1 memory fabric can include additional features related to coordinating access requests across different pipelines.

After executing process 600, dispatch queue interface 402 can queue the instruction for execution (e.g., in dispatch queue 403) until all previously received instructions have been executed. At that point, instruction interface 404 can receive the instruction from dispatch queue 403 as the next instruction to be executed. FIG. 7 shows a flow diagram of a process 700 for executing an instruction in a processing engine (e.g., processing engine 322) according to some embodiments. At block 702, the next instruction to be executed can be received. For instance, instruction interface 404 can read the next instruction from dispatch queue 403. At block 704, the processing engine can poll the interlock controller to determine whether input data for the instruction is ready to be read and whether output data for the instruction can be safely written to the output buffer (e.g., buffer 410 or buffer 416 as the case may be). For example, processing engine 322 can send a first "Poll" request that includes the input virtual address range for the instruction and a second "Poll" request that includes the output virtual address range for the instruction to interlock controller 330. At block 706, the processing engine can receive a response to each polling request from the interlock controller. For example, interlock controller 330 can respond to each polling request with either a "Grant" or "Deny." If, at block 708, the response to one or both polling requests is not "Grant", process 700 can return to block 704 and poll the interlock controller again. In some embodiments, process 700 can wait one or more clock cycles before polling again. In some embodiments where processing engine 322 initially sends two "Poll" requests at block 704, if the response to one request is "Grant" and the response to the other request is "Deny," at the next iteration of block 704, process 700 can just send the poll request that has not yet been granted. In this manner, process 700 can continue to poll the interlock controller until the requests have been granted for both the input virtual address range and the output virtual address range.

If, at block 708, both requests have been granted, then at block 710, the processing engine can execute the instruction. For example, processing engine 322 can enable functional unit 422 to perform its operations. Once enabled, functional unit 422 can proceed to operate without further external control. Depending on the instruction and the implementation of functional unit 422, operations of functional unit 422 can include moving data from buffer locations identified by the input virtual address range into operand registers within functional unit 422, performing computations and/or logic operations, and/or moving data from the operand registers to buffer locations identified by the output virtual address range. In some embodiments, functional unit 422 may read a buffer location multiple times and/or write a buffer location multiple times. Since processing engine 322 maintains the read-lock and write-lock throughout execution, data in the locked buffers is not modified except by functional unit 422. At block 712, execution of the instruction can be completed, which can include, e.g., writing final output data for the instruction to buffer 416 (at locations corresponding to the output virtual address range).

At block 714, once execution is complete, the processing engine can send messages to the interlock controller to clear the read-lock for the input virtual address range and to clear the write-lock for the output virtual address range. For example, processing engine 322 can send a first "Clear" request to interlock controller 330 indicating that the read-lock for the input virtual address range should be cleared and a second "Clear" request to interlock controller 330 indicating that the write-lock for the output virtual address range should be cleared. In some embodiments, block 714 can occur after instruction execution is complete, which can include transferring output data from the registers within functional unit 422 to a buffer (e.g., buffer 410 or buffer 416 as the case may be).

Process 700 can be executed for each instruction in dispatch queue 403. In some embodiments, a processing engine performs process 700 for one instruction at a time, and process 700 for a second instruction can begin after execution of the first instruction is finished. Other implementations are also possible. For instance, in some embodiments, process 700 can begin for the second instruction while the first instruction is being executed at block 710. Depending on the implementation of the processing engine, if the polling requests for the second instruction are granted (block 708 results in "YES") before execution of the first instruction has finished, execution of the second instruction can begin (e.g., if it will not interfere with execution of the first instruction), or process 700 for the second instruction can wait to begin execution at block 710 until execution of the first instruction is completed. As described above, the instruction interface can be designed to issue instructions in order, in which case there is no benefit to polling the interlock controller for any instruction other than the instruction that is next to be executed. Different processing engines in a pipeline can perform process 700 independently of each other to process instructions in their respective dispatch queues. (Thus, instructions dispatched to different processing engines may execute out of order with respect to each other if data dependencies permit.)

In process 700, instruction execution begins only after both the read and write polling requests are granted, and the processing engine maintains the read-lock and write-lock for the instruction execution is complete. In some embodiments, it may be desirable to manage the read-locks and write-locks with finer granularity. By way of example, FIG. 8 shows a flow diagram of another process 800 for executing an instruction in a processing engine (e.g., processing engine 322) according to some embodiments. Process 800 can be generally similar to process 700. At block 802, the next instruction to be executed can be received. For instance, instruction interface 404 can read the next instruction from dispatch queue 403. At block 804, the processing engine can poll the interlock controller to determine whether input data for the instruction is ready to be read. For example, processing engine 322 can send a "Poll" request that includes the input virtual address range for the instruction to interlock controller 330. At block 806, the processing engine can receive a response from the interlock controller. For example, interlock controller 330 can respond with either a "Grant" or "Deny." If, at block 808, the response is "Deny" (or not "Grant"), process 800 can return to block 804 and poll the interlock controller again. In some embodiments, process 800 can wait one or more clock cycles before polling again.

If, at block 808, the response is "Grant," then at block 810, the processing engine can begin to execute the instruction. For example, processing engine 322 can read the input data from buffer 416 (at locations corresponding to the input virtual address range) into input registers of the appropriate functional unit 422 and enable functional unit 422 to perform its operations. Once enabled, functional unit 422 can proceed to generate output data without further external control. The output data can be temporarily stored in registers within functional unit 422.

At block 812, the processing engine can send a message to the interlock controller to clear the read-lock for the input virtual address range. For example, processing engine 322 can send a "Clear" request to interlock controller 330 indicating that the read-lock for the input virtual address range should be cleared. In various embodiments, block 812 can occur at any time after reading of all input data for the instruction from the input buffer by functional unit 422 is completed, including after instruction execution is completed.

At block 814, the processing engine can begin to poll the interlock controller to determine whether output data for the instruction can be safely written to the output buffer (e.g., buffer 410 or buffer 416 as the case may be). For example, processing engine 422 can send a "Poll" request that includes the output virtual address range for the instruction to interlock controller 330. In some embodiments, block 814 can occur at any point before functional unit 422 begins to write any data to the output buffer. For example, if functional unit 422 operates to produce a set of output data in local registers of processing engine 322, the output data can be held in the local registers until processing engine 322 determines that the output data can be written to the output buffer. At block 816, the processing engine can receive a response from the interlock controller. For example, interlock controller 330 can respond with either a "Grant" or "Deny." If, at block 818, the response is "Deny" (or not "Grant"), process 800 can return to block 814 and poll the interlock controller again. In some embodiments, process 800 can wait one or more clock cycles before polling again. If, at block 818, the response is "Grant," then at block 820, the processing engine can write the output data from the registers of the functional unit to the appropriate buffer. For example, processing engine 322 can write output data from registers of functional unit 422 to shared buffer 410. At block 822, after writing the output data, the processing engine can clear the write-lock. For example, processing engine 322 can send a "Clear" message to interlock controller 330 indicating that the write-lock for the output virtual address range should be cleared. Thereafter, process 800 can be repeated for the next instruction in dispatch queue 403.

As processes 700 and 800 illustrate, the point at which a processing engine begins polling the interlock controller for the virtual input address and/or virtual output address can be varied. Polling for both the virtual input address and the virtual output address prior to beginning execution (as in process 700) can simplify the logic and can be particularly appropriate in instances where executing the instruction can involve a series of read and/or write operations targeting a virtual address or range of virtual addresses. Similarly, the point at which a processing engine clears a read-lock and/or a write-lock can be varied. Clearing a read-lock (or write-lock) as soon as the last read operation (or write operation) that occurs during execution of an instruction can help to reduce wait times for subsequent instructions, but for some types of instructions, e.g., instructions where execution involves multiple read-modify-write operations, waiting until the end of the instruction may be desirable.

Figure 9:
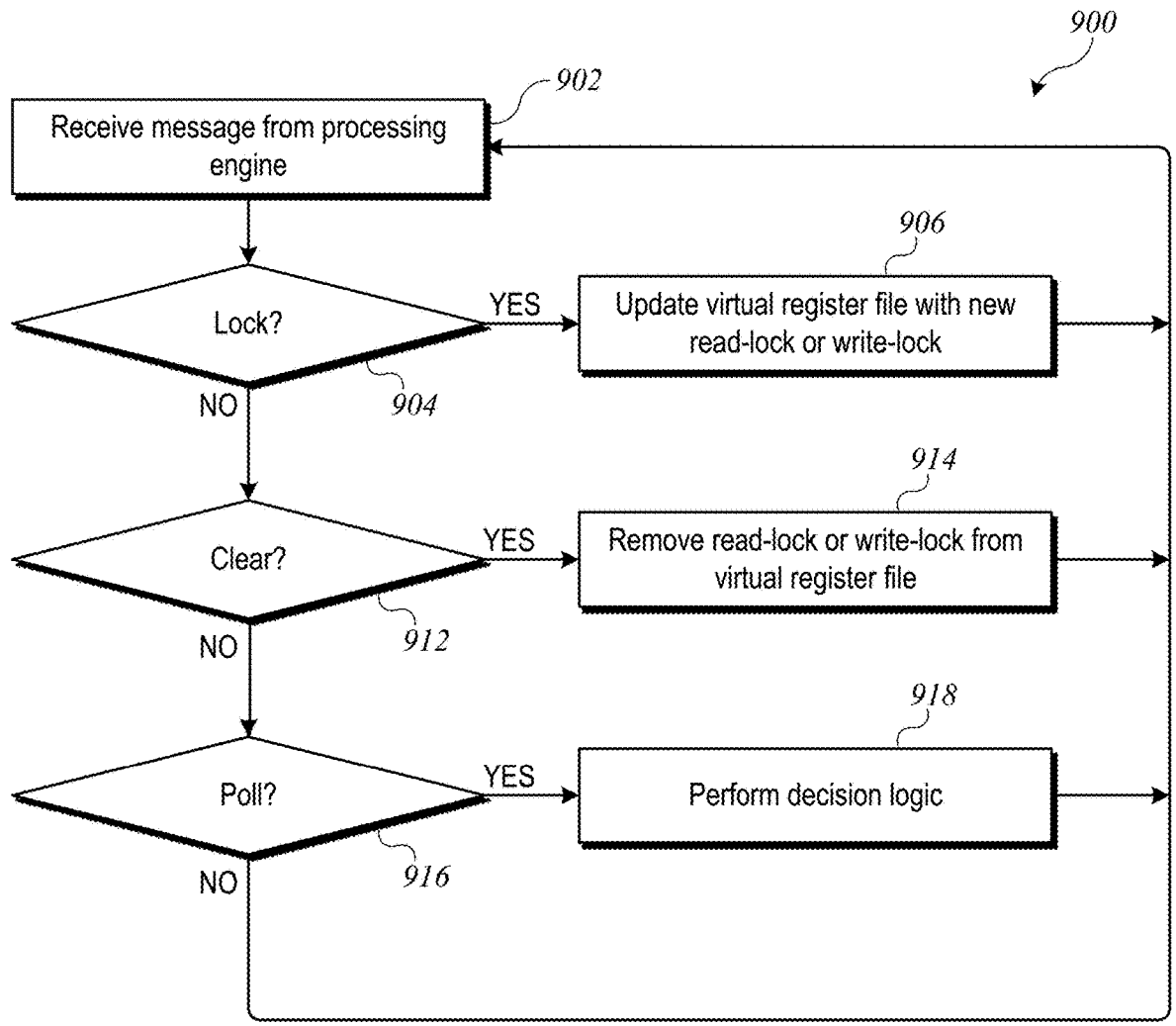
FIG. 9 shows a flow diagram of a process that can be performed by an interlock controller according to some embodiments.
Figure 10:
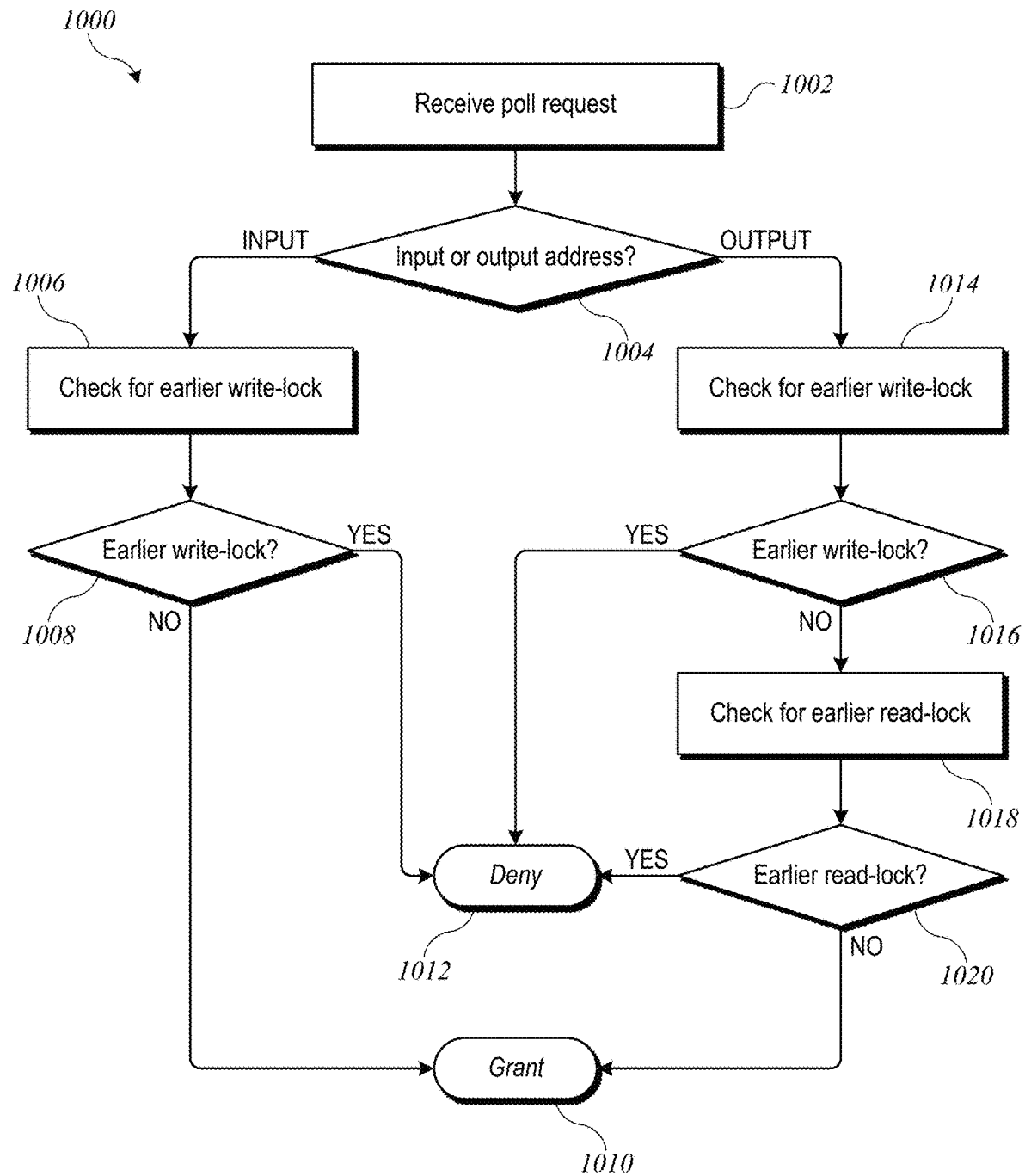
FIG. 10 is a flow diagram of a decision-logic process for an interlock controller according to some embodiments.

In processes 600, 700, and 800, an interlock controller (e.g., interlock controller 330) can receive "Lock" requests to establish read-lock or write-lock, "Clear" requests to remove previously established read-lock or write-lock, and "Poll" requests to query whether data dependencies for a particular read or write operation have been satisfied. FIGS. 9 and 10 are flow diagrams showing operation of an interlock controller such as interlock controller 330.

FIG. 9 shows a flow diagram of a process 900 that can be performed by an interlock controller (e.g., interlock controller 330) according to some embodiments. Process 900 can execute in a continuous loop as messages are received from the processing engines of a pipeline (e.g., pipeline 310). At block 902, a message is received from a processing engine. For example, messages can be received at processing engine interface 536 of interlock controller 330 as shown in FIG. 5. In some embodiments, block 902 can include arbitrating among multiple requests to select a request to process, e.g., as described above with reference to FIG. 5.

If, at block 904, the message is a Lock message, then at block 906, the interlock controller can update the virtual register file (VRF) by adding read-lock or write-lock information for the virtual address range specified in the read-lock or write-lock message. The particular information added can depend on the particular implementation of virtual register file 332 (e.g., data structure 532). For example, in some embodiments, when a read-lock or write-lock is requested by a particular processing engine (e.g., processing engine 322), interlock controller 330 can add an entry to a lock list associated with one or more addresses in the virtual address range specified in the message; the entry can include the identifier of the requesting processing engine and the type of lock (read-lock or write-lock). The list can be an ordered list that reflects the order in which lock requests are received.

If the message is not a Lock message, process 900 proceeds to block 912. If, at block 912, the message is a Clear message, then at block 914, the interlock controller can update the virtual register file by removing (clearing) the read-lock or write-lock information specified in the Clear message. For instance, if adding the read-lock or write-lock information is implemented by adding an entry to a lock list, then clearing the read-lock or write-lock information can be implemented by deleting that entry from the lock list. In some embodiments, the oldest entry having the same processing engine and address range as specified in the Clear message is deleted.

If the message is not a Lock message or a Clear message, process 900 proceeds to block 916. If, at block 916, the message is a Poll message, then at block 918, the interlock controller can invoke decision logic (e.g., decision logic 534) to generate a response (e.g., Grant or Deny), based on whether all relevant data dependencies reflected in the virtual register file have been satisfied. FIG. 10 is a flow diagram of a decision-logic process 1000 according to some embodiments. Process 1000 can be implemented, e.g., in decision logic 534 shown in FIG. 5, and can be performed at block 918 of process 900.

At block 1002, the decision logic can receive a poll request, which can include a virtual address range and an indication of whether the poll request is for an input (read) address range or an output (write) address range. If the poll request is for an input address range, the data dependencies of concern are read-after-write dependencies. If the poll request is for an output address range, then the data dependencies of concern include both write-after-read and write-after-write dependencies. At block 1004, if the poll request is for an input address range, process 1000 can proceed to block 1006. At block 1006, process 1000 can check for any write-lock on any address within the range that was established prior to the read-lock that corresponds to the poll request. In some embodiments, the read-lock that corresponds to the poll request can be recognized as the earliest read-lock for the address range of the poll request that was requested by the processing engine that made the poll request. For example, if virtual register file 332 stores a lock list for a virtual address or virtual address range, processing at block 1006 can include reading the lock list for each address in the input address range to determine whether any write-locks are present ahead of a read-lock associated with the processing engine that sent the poll request. An earlier write-lock indicates a read-after-write data dependency that should be cleared before the requesting processing engine begins to read. At block 1008, if any earlier write-lock exists, then the request should be denied and a "Deny" message can be sent at block 1012. If no earlier write-lock exists, then the request should be granted, and a "Grant" message can be sent at block 1010.

If, at block 1004, the poll request is for an output address range, process 1000 can proceed to block 1014. At block 1014, process 1000 can check for any write-lock on any address within the range that was established prior to the write-lock that corresponds to the poll instruction. In some embodiments, the write-lock that corresponds to the poll request can be recognized as the earliest write-lock for the address range of the poll request that was requested by the processing engine that made the poll request. For example, if virtual register file 332 stores a lock list for a virtual address or virtual address range, processing at block 1014 can include reading the lock list for each address in the input address range to determine whether any write-locks are present ahead of a write-lock associated with the processing engine that sent the poll request. An earlier write-lock indicates a write-after-write data dependency that should be cleared before the requesting processing engine begins to write. At block 1016, if any earlier write-lock exists, then the request should be denied and a "Deny" message can be sent at block 1012. If no earlier write-lock exists, then at block 1018, process 1000 can check for any read-lock on any address within the range that was established prior to the write-lock that corresponds to the poll instruction. In some embodiments, the write-lock that corresponds to the poll request can be recognized as the earliest write-lock for the address range of the poll request that was requested by the processing engine that made the poll request. For example, if virtual register file 332 stores a lock list for a virtual address or virtual address range, processing at block 1018 can include reading the lock list for each address in the input address range to determine whether any read-locks are present ahead of a write-lock associated with the processing engine that sent the poll request. An earlier read-lock indicates a write-after-read data dependency that should be cleared before the requesting processing engine begins to write. At block 1020, if any earlier read-lock exists, then the request should be denied and a "Deny" message can be sent at block 1012. If no earlier read-lock exists, then the request should be granted, and a "Grant" message can be sent at block 1010. Process 1000 can be performed each time a Poll request is received.

Referring again to FIG. 9, in some embodiments of process 900, any message that is not identified as a Lock, Clear, or Poll request can be ignored. In other embodiments, such messages may generate a response, e.g., a negative-acknowledgement ("Nack") indicating that the message was not processed.

It will be appreciated that the processes shown in FIGS. 6-10 are illustrative and that variations or modifications are possible. Order of operations can be modified to the extent that logic permits, operations described separately can be combined, and additional operations not specifically described can be included. For example, the particular point during instruction execution at which a processing engine clears a read-lock or write-lock can be modified, provided that the read-lock (write-lock) is not cleared until the processing engine has finished reading (writing) data from (to) the address range associated with the lock.

In some embodiments, a processing engine can clear a read-lock (or write-lock) for part of an address range. Such partial clearing of a lock may allow another processing engine to begin execution sooner; tradeoffs include more requests to be handled by interlock controller and additional logic in the processing engine to determine when partial clearing is safe.

In some embodiments polling can be replaced by a notification protocol in which the interlock controller determines which processing engines have instructions that are clear of data dependencies and notifies the processing engines without waiting to be polled. (A notification protocol, however, may require more complex decision logic in the interlock controller.) In some embodiments, a pipeline flush operation can be defined that clears all instructions from the dispatch queues and clears all read-locks and write-locks from the virtual register file.

According to some embodiments, a PDSCH decoding pipeline can be implemented using the pipeline architecture described above. A PDSCH decoding pipeline can operate on a standard transmit block (TB) received via a cellular RAN (e.g., 4G/LTE or 5G/NR). The transmit block can contain a number of code blocks (CB), the size of which is defined by the encoding algorithm used. Each code block contains original data that was encoded at the transmitter side using a standard encoding scheme that enables error detection and correction, mapped onto OFDM symbols, converted to time domain, mixed with an RF carrier signal, and transmitted over a channel. For purposes of the present description, it is assumed that the RF signal has been received, converted to baseband, digitized, and transformed to the frequency domain. It is also assumed that OFDM symbol demapping has been performed on the frequency-domain data. Accordingly, the input to the PDSCH decoding pipelines described herein can be a set of log likelihood ratios (LLR), where each LLR indicates the relative likelihood that a particular bit in the (as-transmitted) transmit block was 1 or 0. The particular manner in which LLRs are determined is not relevant to understanding the present disclosure. A PDSCH decoding pipeline can receive the LLRs for the code blocks of a transmit block and can reconstruct a bit sequence corresponding to the original data. In some embodiments, a PDSCH decoding pipeline can support error detection and correction, including hybrid automatic repeat request (HARM) protocols in accordance with applicable standards (e.g., 4G or 5G standards). For instance, the PDSCH pipeline can store LLRs for a bad code block in L1 memory and subsequently combine the stored LLRs with the LLRs for the retransmitted code block.

Figure 11:
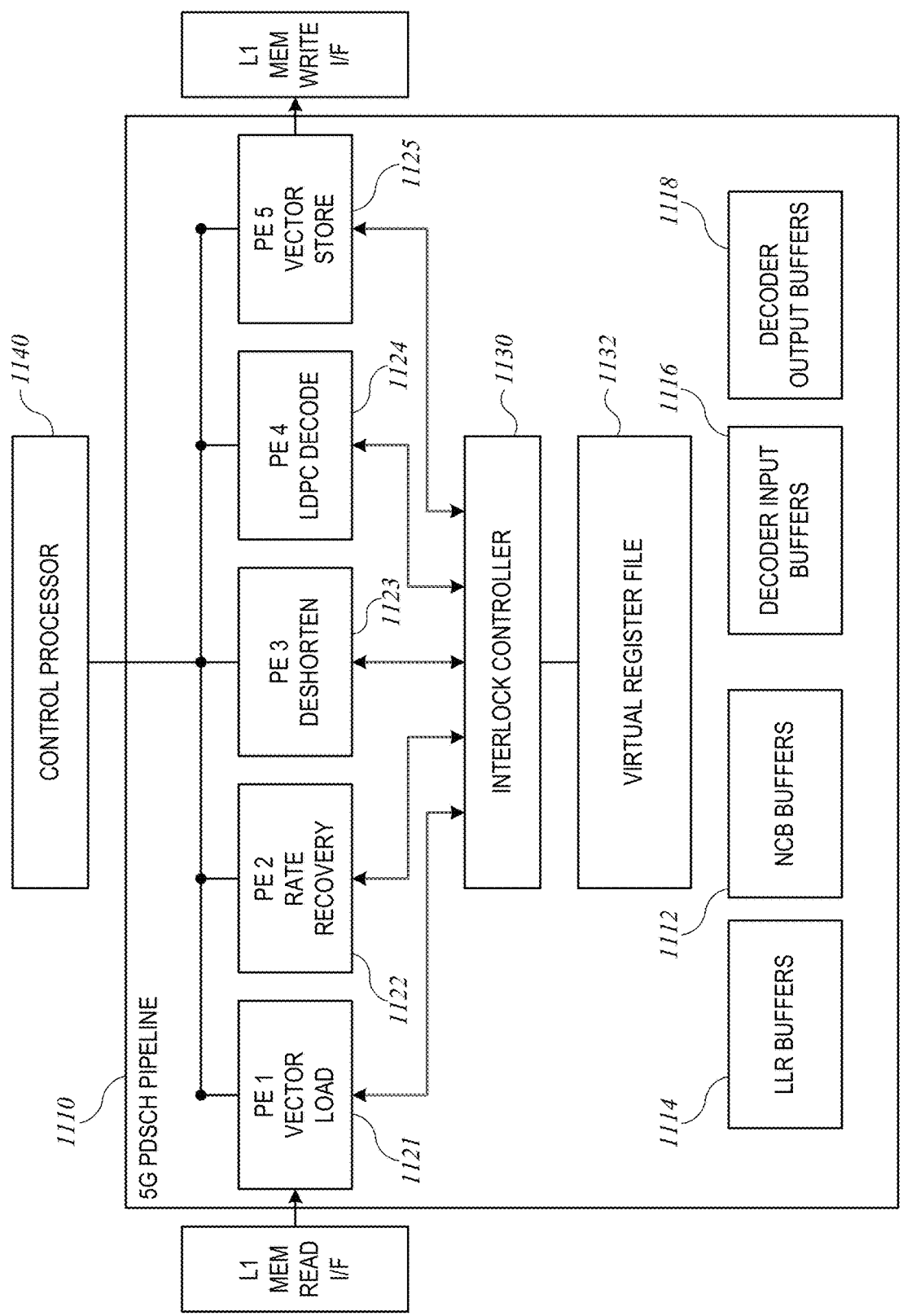
FIG. 11 shows a simplified high-level block diagram of a PDSCH decoding pipeline according to some embodiments.

FIG. 11 shows a simplified high-level block diagram of a PDSCH decoding pipeline 1110 according to some embodiments. PDSCH decoding pipeline 1110 can be an instance of pipeline 310 described above. In this example, it is assumed that decoding pipeline 1110 operates on transmit blocks received via a PDSCH channel of a 5G radio access network, with each transmit block including a number of code blocks. Vector load engine 1121 and vector store engine 1125 can be similar to vector load engine 321 and vector store engine 324 described above. Vector load engine 1121 can write data from L1 memory into LLR buffer 1114 and/or a code-block buffer (referred to as "NCB buffer") 1112. Processing engine 1122 can implement rate recovery operations, which can include de-interleaving and de-rate-matching. In some embodiments, de-rate-matching can include reading data from an NCB buffer 1112 and writing data back to the same location in NCB buffer 1112. Processing engine 1123 can implement deshortening and/or depuncturing operations, which can include reading data from NCB buffer 1112 and writing data to decoder input buffer 1116. Processing engine 1124 can implement a decoder algorithm for PDSCH data. For instance, processing engine 1124 can include a functional unit that implements a LDPC decoder for a 5G PDSCH channel. The LDPC decoder can read data from decoder input buffer 1116 and write data to decoder output buffer 1118. Vector store engine 1125 can write data to L1 memory from either decoder output buffer 1118 or NCB buffer 1112. Control processor 1140 and interlock controller 1130 can be similar or identical to control processor 340 and interlock controller 330 described above. As with other interlock controllers described herein, interlock controller 1130 can maintain a virtual register file 1132 to track data dependencies between processing engines 1121-1125.

Figure 12:
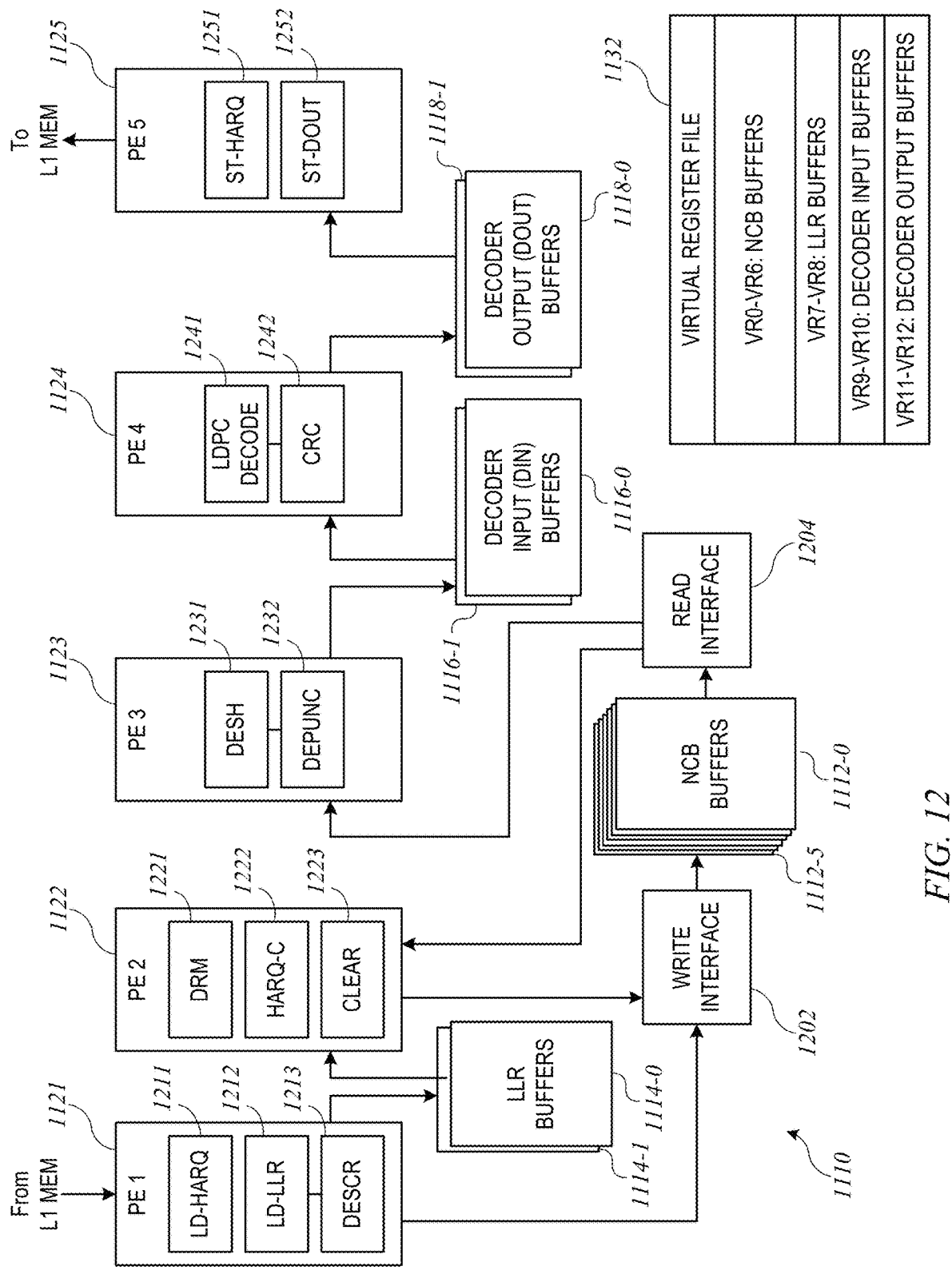
FIG. 12 shows another block diagram of a PDSCH decoding pipeline according to some embodiments.

FIG. 12 shows another simplified block diagram of PDSCH decoding pipeline 1110, showing additional details of data paths and functional units. Processing engine 1121 includes three functional units 1211-1213. Functional unit 1211 can execute a LD-HARQ instruction that reads data for a code block from L1 memory into one of NCB buffers 1112. (It should be understood that all names used herein to refer to instructions executed in various functional units of pipeline 1100 are used solely for convenience of description and are not intended to define or imply a particular instruction set architecture.) In some embodiments, the LD-HARQ instruction is used to retrieve LLRs for a previously-processed code block from L1 memory and load the previous copy into one of NCB buffers 1112, where it can be combined with LLRs for a retransmitted version of the same code block to support error correction. Functional unit 1211 can read data from L1 memory and write data to NCB buffers 1112. Functional unit 1212 can execute a LD-LLR instruction that reads data from L1 memory to be stored in LLR buffers 1114. Functional unit 1213 executes a DESCR instruction to descramble data prior to writing the data to LLR buffers 1114. (Descrambling is a well-understood operation in PDSCH decoding that reverses a scrambling operation performed at the transmitter side.) In some embodiments, functional units 1212 and 1213 form a sub-pipeline: functional unit 1212 can read LLR data for a code block from L1 memory and provide the data to functional unit 1213 via a local vector register file (not shown) within processing engine 1121, and functional unit 1213 can perform descrambling and write the descrambled output to LLR buffers 1114. As noted above, to implement the sub-pipeline, processing engine 1121 can include a local interlock controller (not shown) to manage data dependencies in the local vector register file between functional units 1212 and 1213. The local interlock controller can operate similarly to other interlock controllers described herein.

Processing engine 1122 includes three functional units 1221-1223. Functional unit 1221 can execute a DRM instruction to perform de-interleaving and de-rate-matching. One example implementation of functional unit 1221 is described in above-referenced U.S. Patent Application No. 63/261,649; other implementations can also be used. In some embodiments, functional unit 1221 can read data from LLR buffers 1114 and from NCB buffers 1112 and can also write data back to NCB buffers 1112. In this manner, functional unit 1221 can combine LLRs that correspond to retransmission of the same data bit, using NCB buffers 1112 to store the combined LLRs. In some embodiments, functional unit 1221 can operate on smaller portions of a code block, referred to as "chunks," and functional unit 1212 can load LLRs into LLR buffers 1114 in chunks of appropriate size. Examples of managing pipeline 1110 where different functional units operate on different amounts of data are described below.

Functional unit 1222 can execute a HARQ-C instruction to combine old and new versions of a code block in the event of a retransmission. Functional unit 1223 can execute a CLEAR instruction that clears all data from a specified region within NCB buffers 1112. Functional unit 1223 can write to NCB buffers 1112. In some embodiments, functional unit 1223 can write a default value (zero) into each location being cleared, and the CLEAR instruction need not specify an input virtual address.

Processing engine 1123 includes two functional units 1231, 1232. Functional unit 1231 can execute a DESH instruction to perform a deshortening operation on the LLRs for a code block, and functional unit 1232 can execute a DEPUNC instruction to perform a depuncturing operation. (Deshortening and depuncturing are well-understood operations in 5G PDSCH decoding that reverse the puncturing and shortening operations at the transmitter side, and functional units 1231, 1232 can implement conventional or other algorithms to perform these operations.) In some embodiments, functional units 1231 and 1232 form a sub-pipeline. Functional unit 1231 can read LLR data for a code block from NCB buffers 1112 and perform deshortening, then provide the deshortened data to functional unit 1232 via a local vector register file (not shown) within processing engine 1123. Functional unit 1232 can perform depuncturing and write the depunctured output to decoder input buffers 1116. As noted above, processing engine 1123 can include a local interlock controller to manage data dependencies in the local vector register file between functional units 1231 and 1232 in the sub-pipeline.

Processing engine 1124 includes two functional units 1241, 1242. Functional unit 1241 can execute an LDPC_DECODE instruction to decode a code block, and functional unit 1242 can perform a cyclic redundancy check (CRC) on the decoded output. (LDPC decoding is a well-understood operation in 5G PDSCH decoding, and functional unit 1241 can implement conventional or other algorithms to perform these operations.) Functional unit 1241 can read a code block to be decoded from decoder input buffers 1116 and write the decoded output to decoder output buffers 1118. Functional unit 1242 can perform a CRC on the decoded output and produce a "pass" or "fail" result that can be communicated to control processor 1140 (e.g., via a CSR as described above). In some embodiments, functional units 1241 and 1242 form a sub-pipeline. Functional unit 1241 can read data from decoder input buffers 1116 and perform LDPC decoding, then provide decoded bits to functional unit 1242 via a local vector register file (not shown) within processing engine 1124 as well as writing the decoded bits to decoder output buffers 1118. Functional unit 1242 can perform a CRC check on the decoded bits and produce a "pass" or "fail" result that can be provided to control processor 1140 (e.g., using control and status registers as described above). As noted above, processing engine 1124 can include a local interlock controller to manage data dependencies in the local vector register file between functional units 1241 and 1242 in the sub-pipeline.

Processing engine 1125 includes two functional units 1251, 1252. Functional unit 1251 can execute a ST-HARQ instruction that reads data from NCB buffers 1112 and writes the data to L1 memory. In some embodiments, the ST-HARQ instruction is issued when an error in a code block is discovered (e.g., when the CRC fails), so that the LLRs for the bad code block can be stored for later combination with a retransmitted version. Functional unit 1252 can execute a ST-DOUT instruction that reads data from decoder output buffers 1118 and writes the data to L1 memory.

It should be understood that the combination of functional units and the assignment of particular functional units to processing engines shown in FIG. 12 is illustrative. Various embodiments can include different numbers of processing engines, different combinations of functional units, and/or different assignment of functional units to processing engines. For instance, in some embodiments, the LD-HARQ instruction (executed in functional unit 1211) can be executed to load data from a previous transmission of a code block into NCB buffers 1112 prior to processing data for the retransmitted version of the code block, and the DRM instruction (executed in functional unit 1221) can result in combining the previous data with new data from the retransmission, rather than using a separate HARQ combining process. Accordingly, a functional unit dedicated to HARQ combining (e.g., functional unit 1222 in FIG. 12) can be omitted. As another example, clearing of NCB buffers (performed by functional unit 1223 in FIG. 12) can be implemented in processing engine 1121 or in a separate sixth processing engine as desired.

In some embodiments, NCB buffers 1112, LLR buffers 1114, decoder input buffers 1116 and decoder output buffers 1118 can be structured to facilitate multithreaded operation of pipeline 1110, in which different processing engines 1121-1125 can operate on different code blocks concurrently, with each processing engine operating on one code block at a time. For example, NCB buffers 1112 can include a number of distinct NCB buffers, with each buffer being large enough to store a complete set of LLRs for one code block. In some embodiments, there can be six NCB buffers 1112-0 through 1112-5, with each NCB buffer 1112-$i$ having a size of, e.g., 400×384 bits. As will become apparent, for some implementations six NCB buffers is sufficient to allow each of processing engines 1121-1125 to be operating on a different NCB buffer at the same time, which can help to improve throughput. It should be understood that more or fewer NCB buffers can be provided. In some embodiments, having NCB buffers 1112 local to pipeline 1100 can also help to improve throughput, e.g., by reducing traffic to L1 memory. Each NCB buffer 1112-0 through 1112-5 is mapped to a different virtual address in virtual register file 1132. For instance, in some embodiments with six NCB buffers, virtual addresses VR0 through VR5 can be assigned to the NCB buffers 1112-0 through 1112-5.

As shown in FIG. 12, NCB buffers 1112 can have a write interface 1202 and a read interface 1204. Write interface 1202 and read interface 1204 can each be implemented using a crossbar mux that allows processing engines to access any location in any of NCB buffers 1112. Memory access width can be chosen based on the vector width of SIMD functional units in processing engines 1121-1125. In some embodiments, processing engine 1121 and processing engine 1122 can issue write requests to write interface 1202, and processing engines 1122, 1123, and 1125 can issue read requests to read interface 1204. Write interface 1202 and read interface 1204 can include arbitration logic to select among multiple received requests. In some embodiments, NCB buffers 1112 can be dual-ported so that one read request and one write request can be serviced per cycle. Other implementations can also be used.

LLR buffers 1114 can also include a number of distinct LLR buffers, with each buffer being large enough to store a set of LLRs for one chunk of a data block. In some embodiments, there can be two LLR buffers (1014-0 and 1114-1), and each LLR buffer 1114-0, 1114-1 can be structured to support de-interleaving. For example, each LLR buffer 1114-0, 1114-1 can have ten rows, with each row having capacity to store 256 LLRs (which can be, e.g., 6 bits each). This size is sufficient to support de-interleaving for 5G with constellation size up to 1024QAM. (Other sizes and structures can be used depending on the particular standard(s) being supported.) As described in above-referenced U.S. Patent Application No. 63/261,649, de-interleaving can involve writing to the LLR buffer in column-wise order and reading in row-wise order. The size of a chunk processed by DRM functional unit 1221 can correspond to the size of one LLR buffer 1114-$i$. Two LLR buffers 1114-0, 1114-1 can be sufficient to support ping-pong operation between processing engine 1121 and processing engine 1122, where one processing engine reads from LLR buffer 1114-0 while the other writes to LLR buffer 1114-1; however, having more than two LLR buffers 1114-$i$ is not precluded. Each LLR buffer 1114-0, 1114-1 is mapped to a different virtual address in virtual register file 1132. For instance, in an embodiment with two LLR buffers 1114-0. 1114-1, virtual addresses VR6 and VR7 can be assigned to LLR buffers 1114-0 and 1114-1.

Decoder input (DIN) buffers 1116 can include a number of distinct DIN buffers, and decoder output (DOUT) buffers 1118 can include a number of distinct DOUT buffers. In some embodiments, there can be two DIN buffers 1116-0, 1116-1 and two DOUT buffers 1118-0, 1118-1. Each DIN buffer 1116-$i$ can be large enough to store LLR data for a code block during decoding, and each DOUT buffer 1118-$i$ can be large enough to store the decoded data for a code block. For example, for 5G LDPC decoding, each decoder input buffer 1116-$i$ can have a size of 8*72×384 bits while each decoder output buffer 1118-$i$ has a size of 24×384 bits. Two DIN buffers 1116-0, 1116-1 can be sufficient support ping-pong operation between processing engine 1123 and processing engine 1124, where processing engine 1124 decodes the code block in DIN buffer 1116-0 while processing engine 1123 writes the next code block to DIN buffer 1116-1 (or vice versa). Similarly, two DOUT buffers 1118-0, 1118-1 can be sufficient to support ping-pong operation between processing engine 1124 and processing engine 1125, where processing engine 1125 reads decoded data for one code block from DOUT buffer 1118-1 while processing engine 1124 writes decoded data for the next code block into DOUT buffer 1118-0 (or vice versa). Having more than two DIN (or DOUT) buffers is not precluded. Each DIN buffer 1116-0, 1116-1 and each DOUT buffer 1118-0, 1118-1 is mapped to a different virtual address in virtual register file 1132. For instance, virtual addresses VR8 and VR9 can be assigned to the DIN buffers while virtual addresses VR10 and VR11 are assigned to the DOUT buffers.

As with any implementation of pipeline 310 of FIG. 3, operation of pipeline 1110 can be defined using program code (e.g., firmware) executed by control processor 1140. Control processor 1140 can issue instructions in order to pipeline 1110, and each instruction can enter the dispatch queue (shown in FIG. 4) of the appropriate one of processing engines 1121-1125. The instructions can specify virtual addresses in the virtual address space of pipeline 1110 (e.g., virtual register file 1132), which can encompass all locations in LLR buffers 1114, NCB buffers 1112, decoder input buffer 1116, and decoder output buffers 1118. Virtual addresses can be defined at the granularity of a buffer. For instance, each LLR buffer 1114-0, 1114-1; each NCB buffer 1112-0 through 1112-5; each DIN buffer 1116-0, 1116-1; and each DOUT buffer 1118-0, 1118-1 can be assigned a different virtual address. In some embodiments, the virtual address space can also include one or more virtual addresses mapped to L1 memory (or portions thereof).

Processing engines 1121-1125 can interact with interlock controller 1130 as described above with reference to FIGS. 6 and 7. For example, receipt of an instruction in the dispatch queue of any of processing engines 1121-1125 can trigger sending of a read-lock request for the input virtual address and/or a write-lock request for the output virtual address to interlock controller 1130 (e.g., as shown in FIG. 6). Completion of an instruction in any one of processing engines 1121-1125 can trigger sending of a clear request to interlock controller 1130 (e.g., as shown in FIG. 7). Prior to executing the next instruction in the dispatch queue, each processing engine 1121-1125 can poll interlock controller 1130 with the input virtual address and/or output virtual address of the instruction (as appropriate) and can wait to execute the instruction until interlock controller 1130 returns a Grant response for all polled virtual addresses 1130 (e.g., as shown in FIG. 7). Interlock controller 1130 can implement the logic described above (e.g., as shown in FIGS. 9 and 10) to respond to read-lock, write-lock, clear, and poll requests. Thus, data synchronization within pipeline 1110 can be agnostic to the particular processing activity of processing engines 1121-1125.

Figure 13A:
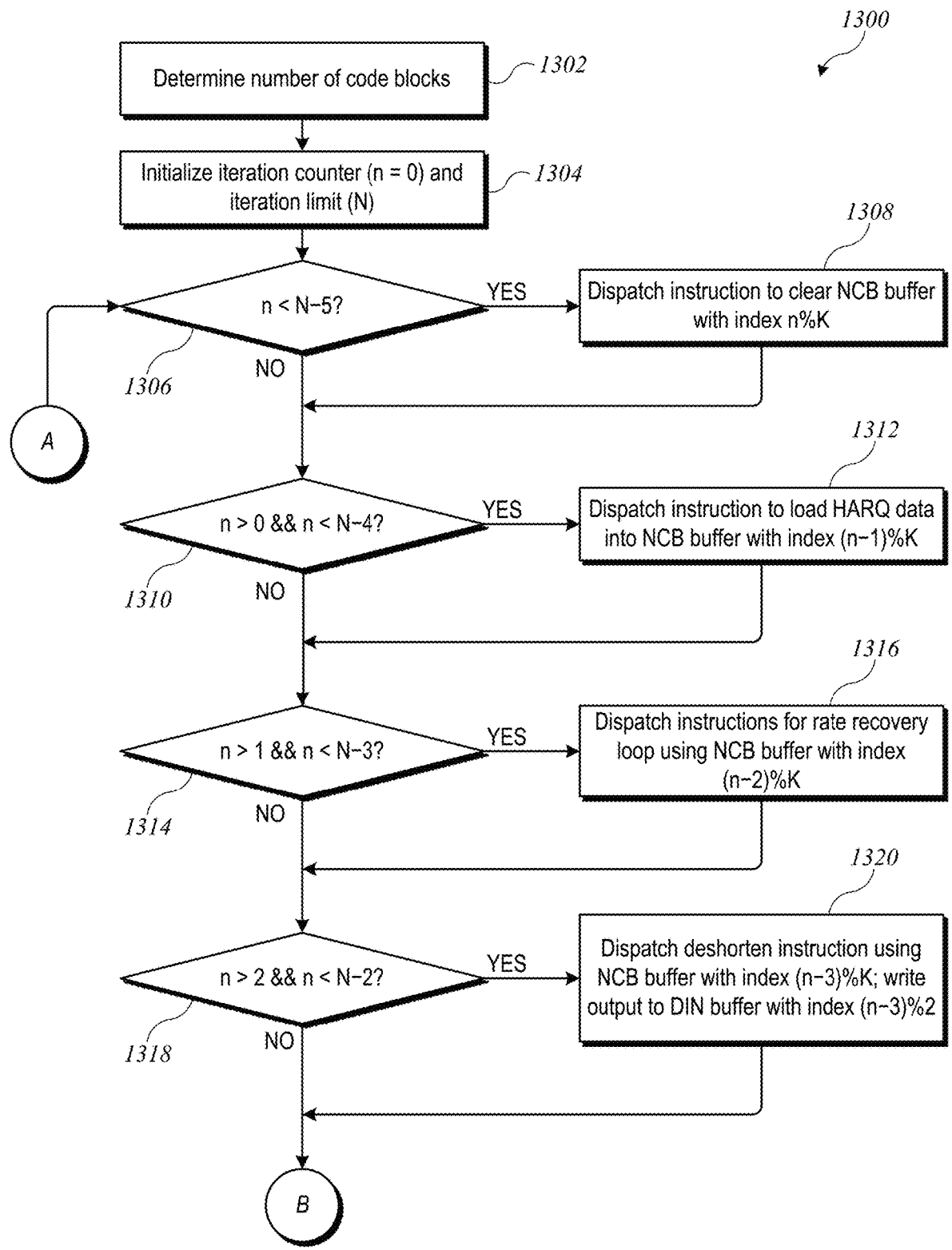
FIGS. 13A and 13B show a flow diagram of a process 1300 for decoding a transmit block using a PDSCH decoding pipeline according to some embodiments.
Figure 13B:
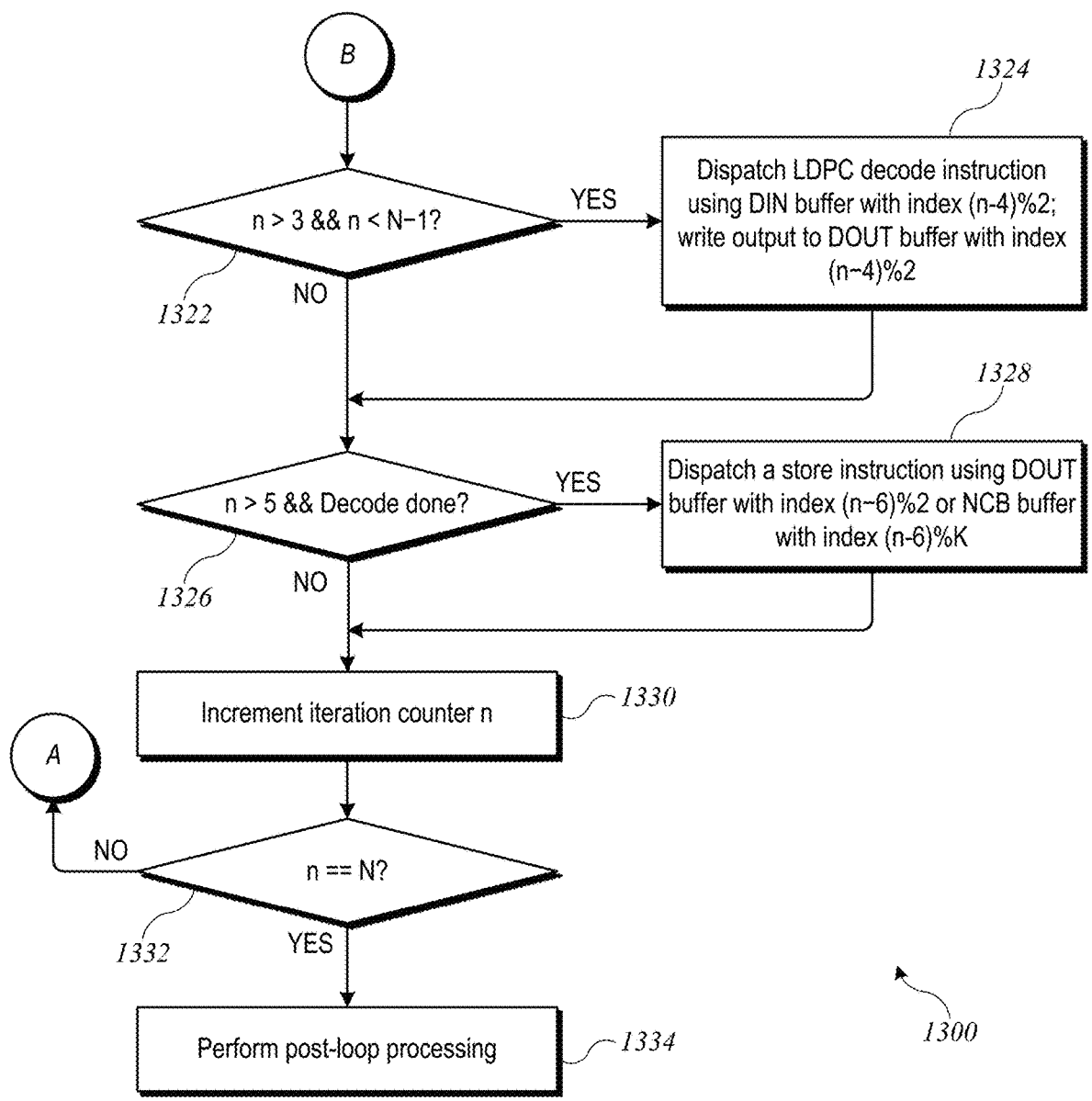

To illustrate operation of pipeline 1110, reference is made to FIGS. 13A and 13B, which show a flow diagram of a process 1300 for decoding a transmit block (TB) using pipeline 1110 according to some embodiments. Process 1300 includes an initialization stage, a main processing loop, and a post-loop stage. Process 1300 can be implemented, e.g., using program code to define a routine (e.g., function or subroutine) to be executed by control processor 1140 at a time when LLRs generated by demapping a received transmit block have been stored in L1 memory of the cellular modem processor in which control processor 1140 and pipeline 1110 reside. In some embodiments, invoking process 1300 can include providing a pointer or other reference to the location in L1 memory where the transmit block is stored, as well as additional information about the transmit block (e.g., size, encoding parameters, etc.).

The initialization stage of process 1300 can begin at block 1302, when a number of code blocks in the transmit block is determined. In some embodiments, the number of code blocks in the transmit block can be included in the received information about the transmit block. At block 1304, a number (N) of iterations of the main processing loop to perform can be determined, and an iteration counter (n) for the main processing loop can be initialized. In some embodiments, the number N of iterations can be based on the number of code blocks in the transmit block. In some embodiments, N can be larger than the number of code blocks. For instance, for reasons that will become apparent, N can be computed by adding a constant number, such as 5, to the number of code blocks. In this example, iteration counter n runs from 0 to N−1; other implementations are possible. In some embodiments, the initialization stage can also include other operations, such as providing configuration parameters specific to the transmit block (e.g., code block size, LDPC base graph, modulation order for interleaving, etc.) to parameter registers in processing engines 1121-1125, e.g., by dispatching instructions to write to the control and status registers (or other parameter registers). As described above, such instructions can be queued in the dispatch queue and executed in order within each processing engine.

The main processing loop can begin at block 1306. In the main processing loop, dispatching and execution of instructions results in data advancing from L1 memory into pipeline 1110, through various buffers 1114, 1112, 1116, 1118 in pipeline 1110 as decoding operations occur, and out to L1 memory after decoding. To avoid wasting cycles on processing invalid data and to improve throughput, process 1300 can dispatch instructions in a staggered fashion for different code blocks, with successively-dispatched instructions pertaining to different operations on different code blocks. Accordingly, various actions in the main processing loop can be conditional on the iteration counter.

For instance, if, at block 1306, iteration counter n is less than N−5, then at block 1308, control processor 1140 can dispatch a CLEAR instruction to pipeline 1110. The CLEAR instruction, which is provided to processing engine 1122, can specify the address of the NCB buffer 1112-$i$ with index n % K as the output virtual address, where K is the number of NCB buffers. (In notation used herein, a % b denotes the modulo operation that returns the remainder of dividing a by b.) As noted above, the CLEAR address in this example does not need an input address. When the CLEAR instruction is executed by functional unit 1223, the NCB buffer 1112-$i$ with index n % K is cleared. This operation is performed in the first iteration to clear NCB buffer 1112-0, which will receive the first code block of the transmit block, and in each subsequent iteration to clear the next NCB buffer (index n % K), which will receive the next code block. Clearing of NCB buffers can stop after iteration N−5 (or at the point where the number of executed iterations becomes equal to the number of code blocks), since after that point there is no more need to clear additional NCB buffers.

If, at block 1310, iteration counter n is greater than 0 and less than N−4, then at block 1312, control processor 1114 can dispatch a LD-HARQ instruction to pipeline 1110. The LD-HARQ instruction, which is provided to processing engine 1121, can specify a location in L1 memory containing HARQ data for the (n−1)th code block as the input virtual address and the NCB buffer 1112-$i$ with index i=(n−1)% K as the output virtual address. When the LD-HARQ instruction is executed by functional unit 1211, HARQ data for a code block is read from the specified L1 memory location and loaded into the specified NCB buffer. In this example, the instruction to load data for a particular NCB buffer 1112-$i$ is dispatched on the next iteration after the instruction to clear the buffer, and the LD-HARQ instruction cycles through the NCB buffers on successive iterations. Loading of data HARQ data can stop after iteration N−4 (or at the point where the number of code blocks loaded becomes equal to the number of code blocks in the transmit block).

If, at block 1314, iteration counter n is greater than 1 and less than N−3, then at block 1316, a rate recovery loop is executed using the NCB buffer 1112-$i$ with index i=(n−2)% K. The rate recovery loop can be implemented by iteratively dispatching LD-LLR instructions and DRM instructions to pipeline 1110, e.g., as described below with reference to FIG. 14. The rate recovery loop results in de-interleaved and de-rate-matched data being stored in the NCB buffer 1112-$i$ with index i=(n−2) % K. In this manner, rate recovery for one code block can be performed using one NCB buffer (e.g., NCB buffer 1112-0) while HARQ data for the next code block is loaded into a different NCB buffer (e.g., NCB buffer 1112-1). Execution of the rate recovery loop can stop after iteration N−3 (or at the point where rate recovery has been performed for the last code block in the transmit block).

If, at block 1318, iteration counter n is greater than 2 and less than N−2, then at block 1320, control processor 1140 can dispatch a DESH instruction to pipeline 1110. The DESH instruction, which is provided to processing engine 1123, can specify the address of the NCB buffer 1112-*i* with index i=(n−3)% K as the input virtual address and the address of the DIN buffer 1116-*i* with index i=(n−3)%2 as the output virtual address. When the DESH instruction is executed by functional unit 1231, deshortening is performed for the code block stored in the NCB buffer 1112-*i* with index i=(n−3)% K. In some embodiments, functional unit 1231 is pipelined into functional unit 1232, and executing a DESH instruction results in both deshortening and depuncturing being performed for the code block. The output of deshortening/depuncturing is written to the DIN buffer 1116-*i* with index i=(n−3)%2. Execution of deshortening/depuncturing can stop after iteration N−3 (or at the point where deshortening/depuncturing has been performed for the last code block in the transmit block).

Referring now to FIG. 13B, process 1300 continues (node B). If, at block 1322, iteration counter n is greater than 3 and less than N−1, then at block 1324, control processor 1140 can dispatch an LDPC_DECODE instruction to pipeline 1110. The LDPC_DECODE instruction, which is provided to processing engine 1124, can specify the decoder input buffer 1116-*i* with index i=(n−4)%2 as the input virtual address and the decoder output buffer 1118-*i* with index i=(n−4)%2 as the output virtual address. When the LDPC_DECODE instruction is executed by functional unit 1241, the code block in the decoder input buffer 1116-*i* with index i=(n−4)%2, and the decoded bits are written to the decoder output buffer 1118-*i* with index i=(n−4)%2. In some embodiments, functional unit 1241 is pipelined into functional unit 1242, and executing an LDPC_DECODE instruction results in decoding in functional unit 1241 followed by CRC in functional unit 1242. The result of the CRC (e.g., pass or fail) can be written to a control and status register of processing engine 1124.

If, at block 1326, iteration counter n is greater than 5 and decoding of a code block is completed, then data can be stored to L1 memory. In some embodiments, processing engine 1124 can use control and status registers to indicate whether (and optionally for which code block) LDPC decoding is finished, and at block 1326, control processor 1140 can read the control and status registers to determine whether decoding is completed. If the conditions are met, then at block 1328, control processor 1110 can dispatch an instruction to store the data. In some embodiments, control processor 1140 can read the pass/fail result of the CRC from control and status registers of processing engine 1124. If the CRC passed, control processor 1140 can dispatch a ST-DOUT instruction to pipeline 1110 using the decoder output buffer 1118-*i* with index i=(n−6)%2 as the input virtual address and a location in L1 memory that receives decoded code blocks as the output virtual address. If the CRC failed, control processor 1140 can dispatch a ST-HARQ instruction to pipeline 1110 using the NCB buffer 1112-*i* with index i=(n−6)% K and a location in L1 memory that receives HARQ data as the output virtual address. When the ST-DOUT instruction is executed by functional unit 1252 (or when ST-HARQ is executed by functional unit 1251), the data from the input location is written to L1 memory, and processing of the code block is complete.

At block 1330, iteration counter n can be incremented (e.g., by adding 1). If, at block 1332, if n has not reached its ending value (N), process 1300 can return to block 1306 (as indicated by node A) to perform the next iteration.

After completing N iterations of the main processing loop, process 1300 can perform post-loop processing at block 1334. For example, due to the structure of the main processing loop, instructions to write the decoded data (or HARQ data as the case may be) for the last code block(s) of the transmit block to L1 memory might not have been dispatched during the main processing loop. Accordingly, post-loop processing at block 1334 can include dispatching one or more additional ST-DOUT and/or ST-HARQ instructions, similarly to block 1328. Other operations can also be implemented in the post-loop processing stage if desired.

Figure 14:
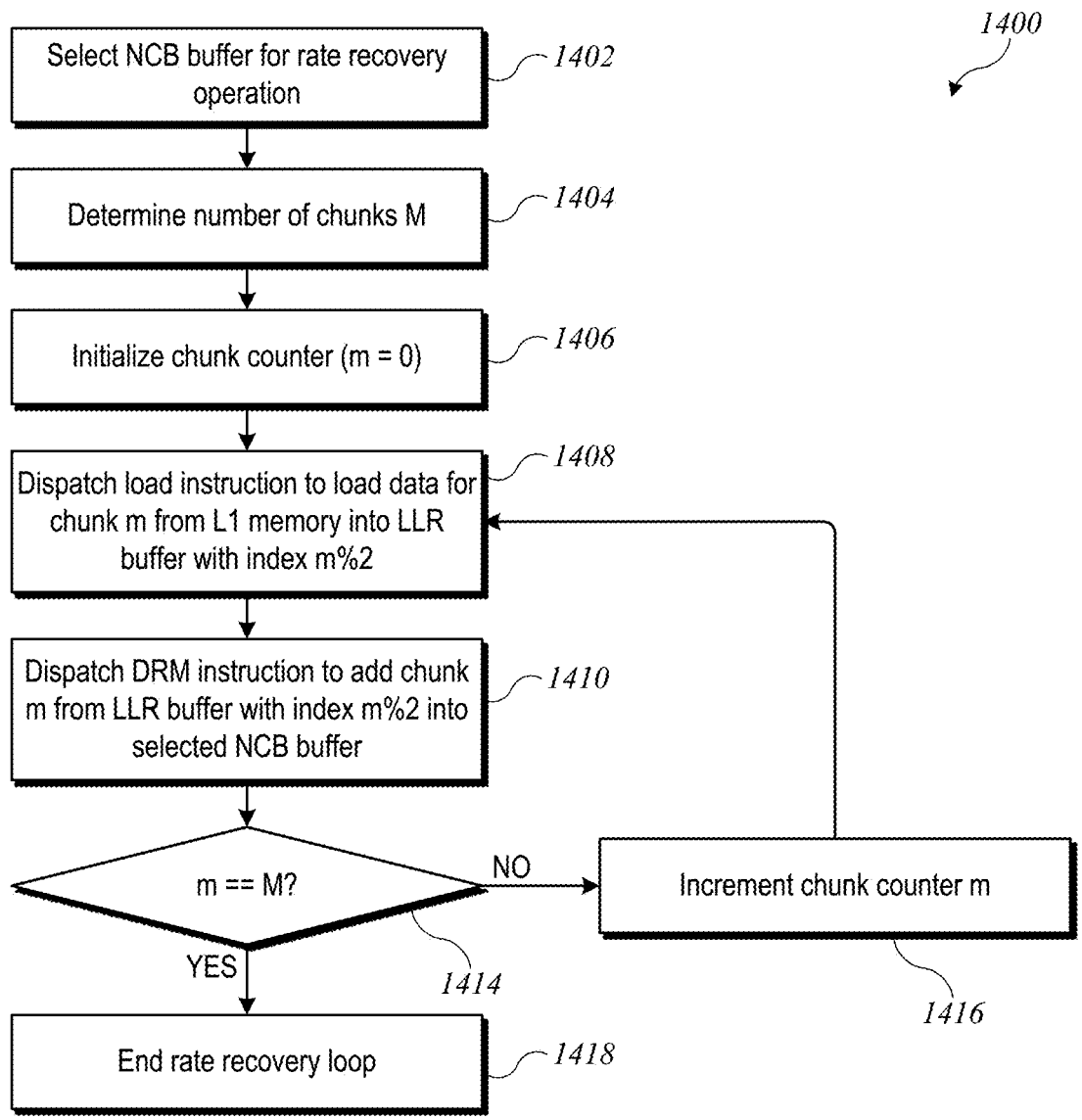
FIG. 14 show a flow diagram of a rate recovery process using a PDSCH decoding pipeline according to some embodiments.

In some embodiments, rate recovery at block 1316 can be implemented using a loop, where each iteration operates on a smaller amount of data than a code block (referred to herein as a "chunk"). For example, in 5G PDSCH encoding, rate matching (which generally involves repeating portions or all of a code block) is performed prior to interleaving. To reverse these operations in the PDSCH decoding pipeline, it can be expedient to combine interleaving and de-rate matching, to reduce the amount of data that needs to be buffered within the pipeline. Accordingly, rate recovery for a code block can be performed by reading and processing the LLRs in chunks. FIG. 14 show a flow diagram of a rate recovery process 1400 using pipeline 1110 according to some embodiments. From the perspective of program code, process 1400 can be implemented, e.g., as a loop in the program code implementing block 1316 of process 1300.

At block 1402, process 1400 can select an NCB buffer to be used for the rate recovery operation. In some embodiments, the NCB buffer is selected based on the iteration counter n of the main processing loop of process 1300. For instance, at iteration n, the NCB buffer 1112-*i* with index i=(n−2) % K can be selected. At block 1404, the number (M) of chunks in the code block for which rate recovery is being performed (e.g., the (n−2)th code block in the transmit block) can be determined. In some embodiments, the number of chunks in a code block can be determined based on the transmit block size and other information about the transmit block (e.g., the modulation order). For instance, the chunk size can be defined to correspond to the capacity of one of LLR buffers 1114, and the number of chunks can be determined by dividing the code block size by the chunk size. If the code block does not contain an integer number of chunks, M can be rounded up to the next integer. At block 1406, a chunk counter m can be initialized (e.g., to m=0). The chunk counter is used to count iterations of the rate-recovery loop in process 1400.

The rate recovery loop can include iteratively dispatching LD-LLR and DRM instructions to pipeline 1110. For instance, at block 1406, control processor 1140 can dispatch a LD-LLR instruction to pipeline 1110. The LD-LLR instruction, which is provided to processing engine 1121, can specify the region of L1 memory containing the next chunk as the input virtual address and the LLR buffer 1114-*i* with index i=m %2 as the output virtual address. When the LD-LLR instruction is executed by functional unit 1212, the chunk can be read from L1 memory and loaded into the LLR buffer 1114-*i* with index i=m %2. In this example, the output virtual address for successive iterations ping-pongs between the two LLR buffers 1114-0, 1114-1.

At block 1410, control processor 1140 can dispatch a DRM instruction to pipeline 1110. The DRM instruction, which is provided to processing engine 1122, can specify the LLR buffer 1114-*i* with index i=m %2 as the input virtual address and the selected NCB buffer from block 1402 (e.g., the NCB buffer 1112-*i* with index i=(n−2) % K) as the output virtual address. When the DRM instruction is executed by functional unit 1221, LLRs from the input LLR buffer 1114-*i* are read and combined with existing LLRs read from the selected NCB buffer, and the resulting updated LLRs are written back to the selected NCB buffer. In some embodiments, the selected NCB buffer can be specified as both an input virtual address and an output virtual address for the DRM instruction, so that processing engine 1122 issues both a read-lock and a write-lock for the selected NCB buffer. In this example, the input LLR for successive iterations pingpongs between the two LLR buffers 1114-0, 1114-1, while the input/output NCB remains the same. Accordingly, multiple LLRs corresponding to the same data bit can be accumulated. In some embodiments, execution of the DRM instruction can depend on whether the current chunk is the last chunk (which may be an incomplete chunk) or a chunk other than the last chunk. Accordingly, if desired, control processor 1140 can set a flag or other indicator when dispatching the DRM instruction to processing engine 1122 to indicate whether the current code block is the last. (Alternatively, two different instruction opcodes for the DRM instruction can be defined, with both opcodes being executed by functional unit 1221.)

If, at block 1414, chunk counter m has not reached M, then at block 1416, process 1400 increment chunk counter m (e.g., by adding 1), and process 1400 can return to block 1408 to process the next chunk. When chunk counter m reaches M, all chunks of the code block have been processed, and process 1400 can end at block 1410. Where process 1400 is implemented at block 1316 of process 1300, process 1300 can continue at block 1318.

Flow control in pipeline 1110 during processes 1300 and 1400 will now be described. As each instruction is dispatched to pipeline 1110 and routed to one of processing engines 1121-1125, the dispatch queue in the processing engine that receives the instruction issues a read-lock for the input buffer and a write-lock for the output buffer to interlock controller 1130. For instance, the first instruction dispatched to pipeline 1110 during process 1300 (other than parameter-setting instructions) can be CLEAR (VR0), where VR0 is the virtual address of NCB buffer 1112-0. Upon receipt of the CLEAR (VR0) instruction, the dispatch queue of processing engine 1122 issues a write-lock for virtual address VR0 to interlock controller 1130. Processing engine 1122 can begin polling interlock controller 1130 with virtual address VR0 and can issue the CLEAR instruction to functional unit 1223 once interlock controller 1130 returns "Grant." The second instruction dispatched to pipeline 1110 can be CLEAR (VR1), where VR1 is the virtual address of NCB buffer 1112-1. This instruction is also received at processing engine 1122, which can issue a write-lock for virtual address VR1 to interlock controller 1130. Processing engine 1122 can issue the second CLEAR instruction to functional unit 1223 after functional unit 1223 finishes the first CLEAR instruction and interlock controller 1130 returns "Grant" for writing to VR1. The third instruction dispatched to pipeline 1110 can be LD-HARQ (L1 addr, VR0), where "L1 addr" denotes a region in L1 memory and VR0 is the virtual address of NCB buffer 1112-0. Upon receipt of the LD-HARQ (L1 addr, VR0) instruction, the dispatch queue of processing engine 1121 issues a write-lock for VR0 and a read-lock for L1 addr. Processing engine 1121 can begin polling interlock controller with virtual addresses L1 addr and VR0, and interlock controller 1130 can return Grant after all previous read-locks and write-locks for these virtual addresses (e.g., the write-lock associated with the CLEAR (VR0) instruction) have been cleared. Thus, functional unit 1222 is prevented from writing data to NCB buffer 1112-0 until NCB buffer 1112-0 has been cleared. Similar considerations apply as each instruction is executed: as long as different instructions specify different virtual addresses (which map to different physical buffers), each processing engine can operate independently, executing its own instructions (in order) regardless of what other processing engines may be doing. Where different instructions specify the same virtual address, interlock controller 1130 enforces the data dependencies. In this manner, the same sequence of operations (load from L1 memory, rate recovery, deshortening/depuncturing, LDPC decoding, and storing decoded data to L1 memory) can be performed for each code block. Different processing engines can operate concurrently on different code blocks stored in different physical buffers, while correct order of operations affecting each code block is preserved. Stated differently, pipeline 1110 can provide a multithreaded processing pipeline in which each code block is processed in a different thread and multiple threads can be executing concurrently.

Multithreaded operation of pipeline 1110 using process 1300 is further illustrated with reference to FIG. 15, which is a simplified timing diagram showing how different functional units in pipeline 1110 can operate concurrently on data associated with different code blocks (or threads) during execution of process 1300. Time runs along the horizontal axis. Each row corresponds to a different functional unit in pipeline 1110. The rows are ordered according to the sequence of operations in a thread as defined by process 1300. Each box indicates execution of instructions, with the width of a box suggesting relative execution times for different instructions. (While a wider box correlates with a longer execution time, the width is not to any particular scale.) Different line styles indicate different threads, to aid in visualization. Each box is annotated to indicate the code block "[cb #]" being operated on, the destination virtual address, and the source virtual address (using the virtual address mapping in FIG. 12). Addresses in L1 memory space are denoted generically as "(L1)". In this example, CLEAR functional unit 1223 does not use a shared source location, and the source location in box 1501 is unspecified. Timing is shown for three complete threads (where each thread operates on a different code block), but the principles can be extended to any number of threads.

Figure 15:
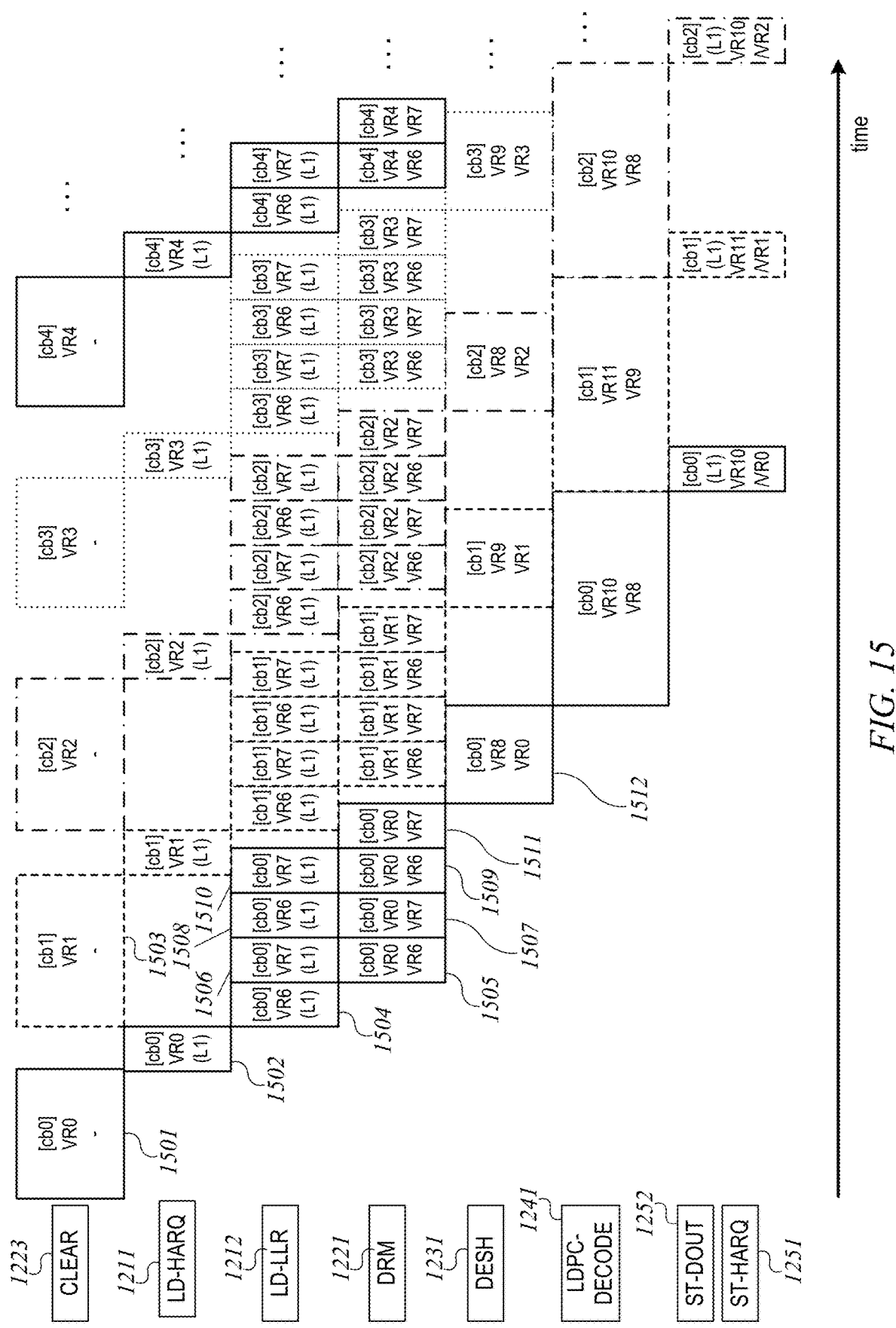
FIG. 15 shows a simplified timing diagram for a PDSCH decoding pipeline according to some embodiments.

As FIG. 15 illustrates, different functional units can execute instructions concurrently for different threads. Data dependencies are managed by interlock controller 1130 as described above. Thus, for example, the first CLEAR instruction (box 1501) writes to virtual address VR0 (which maps to NCB buffer 1112-0). The first LD-HARQ instruction (box 1502) also writes to virtual address VR0, and interlock controller 1130 can prevent LD-HARQ functional unit 1211 from executing its first instruction until functional unit 1223 has cleared its write-lock for VR0. In embodiments described herein, instructions dispatched to the same processing engine are executed in order relative to each other, regardless of any data dependencies (since each dispatch queue issues instructions in order); however, instructions dispatched to different processing engines can potentially be executed out of order relative to each other if they do not have any data dependencies.

FIG. 15 shows the rate-recovery loop of process 1400 as part of each thread. Box 1504 can correspond to the first LD-LLR (L1 addr, VR6) instruction dispatched at block 1408 of process 1400. Box 1505 can correspond to the first DRM (VR6, VR0) instruction dispatched at block 1410 of process 1400. Processing engine 1122, which includes DRM functional unit 1221 can begin polling interlock controller 1130 using input virtual address VR6 before LD-LLR functional unit 1212 finishes loading data into LLR buffer 1114-0, but interlock controller 1130 does not send a "Grant" response until LD-LLR functional unit 1212 clears its write-lock for virtual address VR6. As described above, the LD-LLR and DRM instructions for all chunks in code block 0 (boxes 1504-1511) are dispatched before the DESH (VR0, VR8) instruction for code block 0 (box 1512). Read-locks and write-locks are established according to the order of instruction dispatch, and consequently, a polling request from processing engine 1123 (which includes DESH functional unit 1231) for reading from VR0 does not receive a "Grant" response until all of the read-locks and write-locks associated with the instructions in boxes 1504-1511 have been cleared, which does not happen until the rate recovery loop for code block 0 is completed. In this manner, interlock controller 1130 can naturally enforce correct execution of firmware-defined loops within a thread without needing to know that a loop exists.

As this example illustrates, by tracking the read-locks and write-locks from the processing engines 1121-1125 in pipeline 1110, and by granting or denying poll requests from processing engines 1121-1125 in pipeline 1110 based on the absence or presence of earlier read-locks and/or write-locks (e.g., as described above with reference to FIG. 10), interlock controller 1130 can enforce in-order execution of operations within a thread while allowing other threads to execute independently as long as no buffer-access conflicts arise between threads. Buffer-access conflicts between threads can be managed by interlock controller 1130 using exactly the same logic that manages data dependencies within threads: instructions, regardless of thread, are granted access to a particular buffer only after any previous read-locks and/or write-locks have been cleared, regardless of what thread a particular instruction may be associated with. Thus, interlock controller 1130 can enforce correct behavior within or among threads while remaining agnostic as to how many processing engines (or functional units) are present in pipeline 1100, how many thread are being executed, what operations are being performed in each thread, or how long a given operation may take.

It should also be noted that control processor 1140 can be agnostic to the operation of interlock controller 1130. For instance, the program code executed by control processor 1140 (e.g., implementing process 1300) does not need to include any instructions regarding read-locks, write-locks, or polling; these operations are performed for every instruction by hardware in pipeline 1110. In some embodiments, the instructions dispatched by control processor 1140 can identify input and output buffers using the same virtual addresses used by interlock controller 1130. Alternatively, instructions dispatched by control processor 1140 can use a different addressing scheme (e.g., physical addresses or a buffer index or the like), and processing engines 1121-1125 can translate the addresses in the dispatched instructions to virtual addresses for communication with interlock controller 1130. Regardless of the particular addressing scheme, as long as input and output addresses for each instruction are specified such that different addresses correspond to different physical data-storage locations and to different virtual addresses in the virtual address space used by interlock controller 1130, the desired behavior is automatically produced by the hardware in the pipeline. In addition, control processor 1140 does not need to determine whether a particular instruction is ready to execute. Control processor 1140 can simply dispatch instructions sequentially to pipeline 1110, and the hardware in pipeline 1110 can manage the execution in the manner described above. If one or more dispatch queues in pipeline 1110 fills to capacity, backpressure can be used to pause instruction dispatch by control processor 1140 until space becomes available in the relevant dispatch queue. Control processor 1140 can also be agnostic to how the various functional units that execute instructions are assigned to processing engines; routing logic within pipeline 1110 can direct each dispatched instruction to the correct processing engine.

FIG. 15 illustrates multithreading for different code blocks. It should be understood that the code blocks can be, but need not be, from the same transmit block. For example, once control processor 1140 has finished executing process 1300 for one transmit block, control processor 1140 can begin executing process 1300 again for a different transmit block, without waiting for previously dispatched instructions to be executed in pipeline 1110. (To the extent that instructions for the next transmit block may attempt to access buffers that are still in use for the previous transmit block, e.g., due to resetting the iteration counter n, interlock controller 1130 can delay execution of the later-dispatched instructions until data dependencies are clear.) In some instances, different transmit blocks may have different encoding parameters. For instance, rate-matching parameters, LDPC parameters such as base graph and/or lifting size, and other encoding parameters may change between transmit blocks to compensate for changes in channel conditions). To the extent that different transmit blocks have different encoding parameters, control processor 1140 can dispatch instructions to pipeline 1110 to update the parameters (e.g., during the initialization phase of process 1300) during the initialization stage of process 1300. These parameter-update instructions can be queued in order with all other instructions in the dispatch queues of processing engines 1121-1125, and each processing engine 1121-1125 can update its parameter registers (by executing the parameter-update instructions) after completing execution of the remaining instructions for the previous transmit block. Accordingly, in some embodiments there is no need to flush the pipeline between transmit blocks, even when parameters change.

Figure 16:
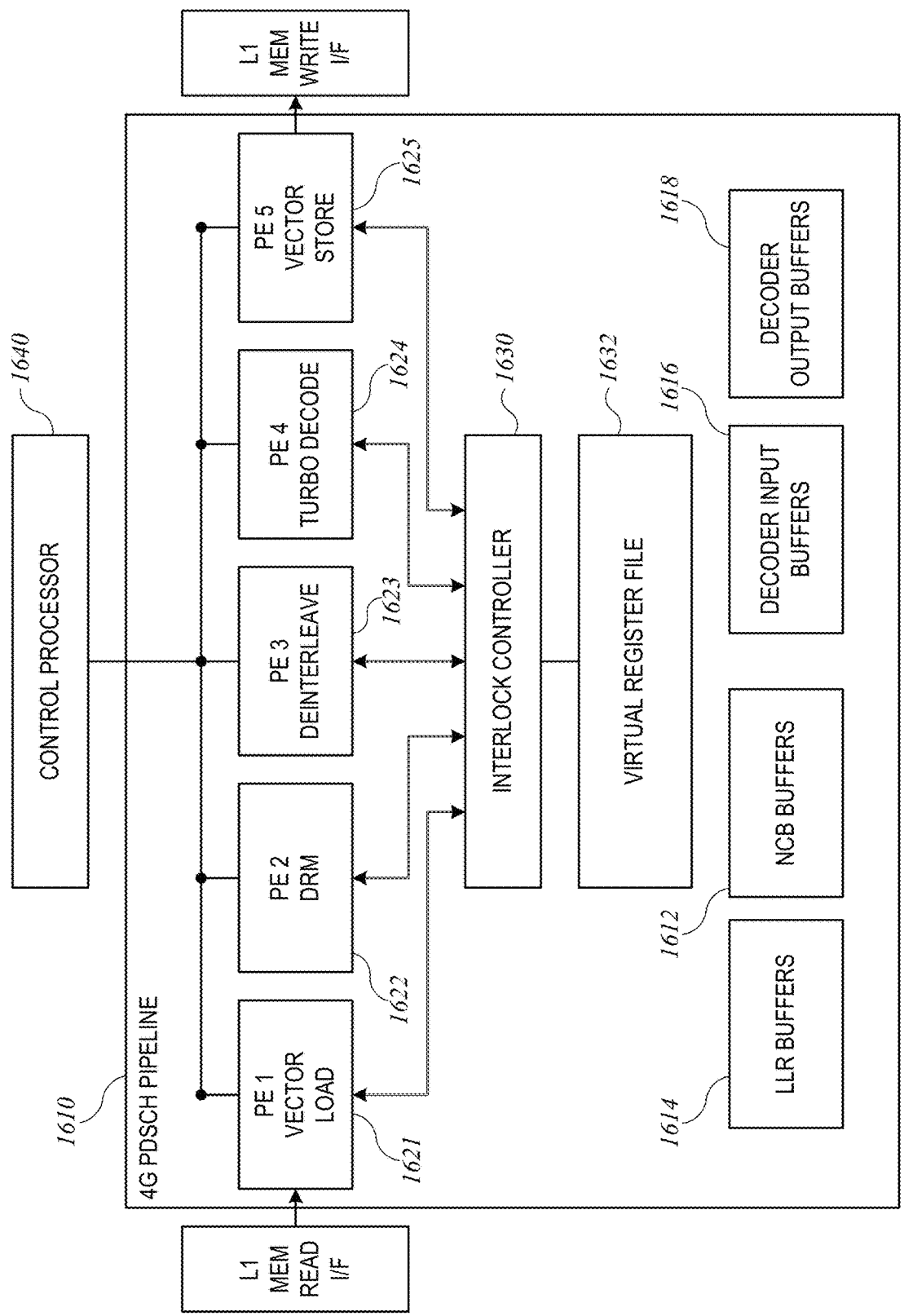
FIG. 16 shows a simplified high-level block diagram of a PDSCH decoding pipeline according to some embodiments.

Other pipelines can be implemented using the same principles and data synchronization circuits. By way of example, FIG. 16 shows a simplified block diagram of a 4G PDSCH decoding pipeline 1610, according to some embodiments. Decoding pipeline 1610 can be another instance of pipeline 310 described above. In this example, it is assumed that decoding pipeline 1610 operates on data received via a PDSCH channel of a 4G radio access network. Since PDSCH decoding for 4G networks has many similarities to PDSCH decoding for 5G networks, pipeline 1610 can be generally similar to pipeline 1110, Vector load engine 1621 and vector store engine 1625 can be similar or identical to vector load engine 1121 and vector store engine 1125 described above. Vector load engine 1125 can write data read from L1 memory into LLR buffers 1614. Processing engine 1622 can implement rate recovery, and processing engine 1623 can implement de-interleaving. Processing engine 1624 can implement a Turbo decoder algorithm for a 4G PDSCH code block. Pipeline 1610 can also include NCB buffers 1612 that are accessible to at least some of processing engines 1621-1625. Control processor 1640 and interlock controller 1630 can be similar or identical to control processor 340 and interlock controller 330 (or control processor 1140 and interlock controller 1130).

Figure 17:
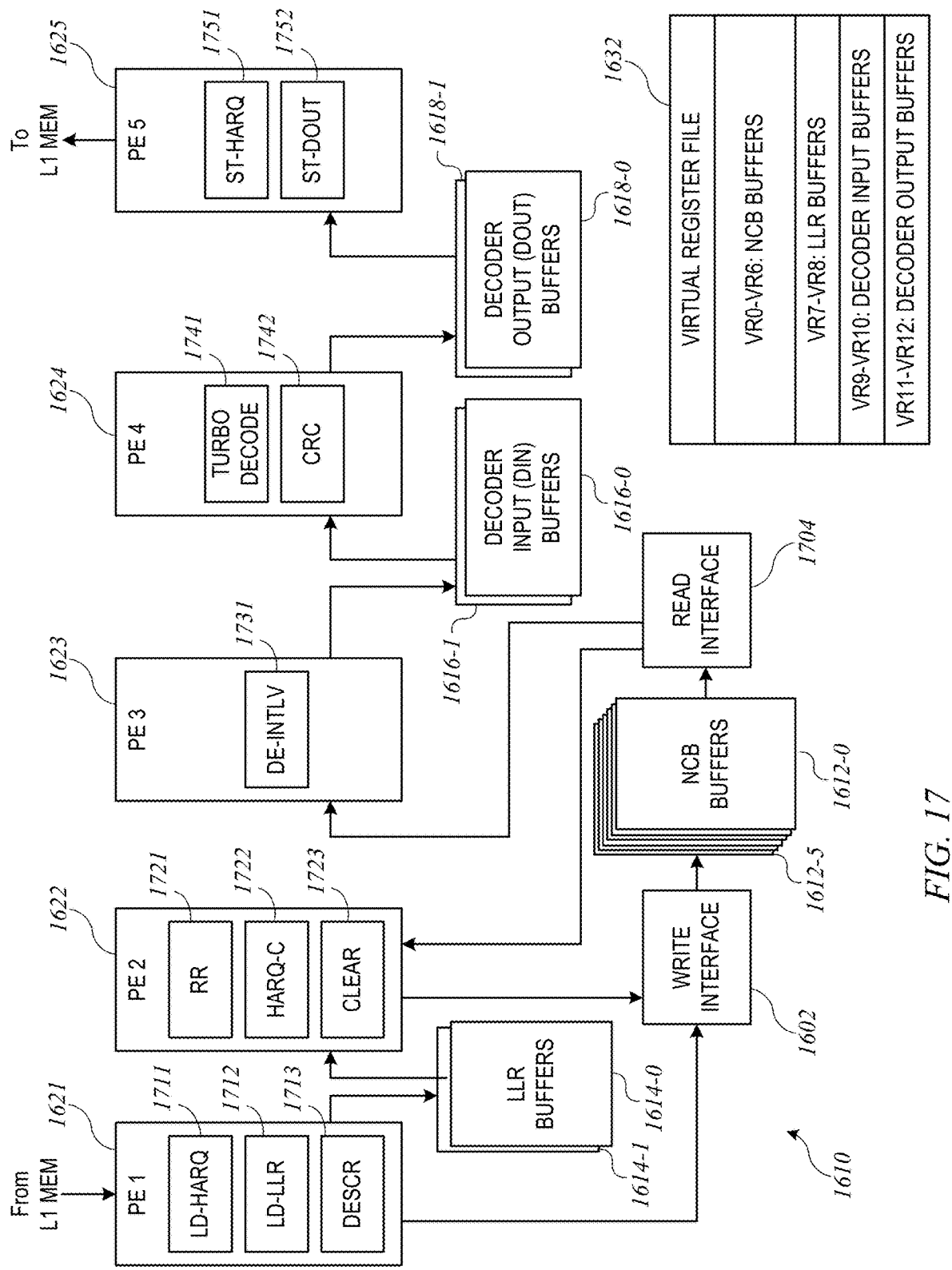
FIG. 17 shows another block diagram of a PDSCH decoding pipeline according to some embodiments.

FIG. 17 shows another block diagram of 4G PDSCH pipeline 1610, showing additional details of data paths and functional units. Processing engine 1621, which can be similar or identical to processing engine 1121 described above, includes three functional units 1711-1713. Processing engines 1622 and 1623 differ from processing engines 1122 and 1123 because in 4G PDSCH data encoding, rate matching is performed after interleaving. Accordingly, in pipeline 1610, rate recovery can precede de-interleaving. Processing engine 1622 can include a rate recovery (RR) functional unit 1721 that implements de-rate-matching, as well as HARQ-C functional unit 1722 and CLEAR functional unit 1723, which can be similar or identical to their counterparts in 5G processing engine 1122. Processing engine 1623 can include a de-interleaving functional unit 1731 that can perform de-interleaving of sub-blocks. Processing engine 1624 can include two functional units 1741, 1742. Functional unit 1741 can implement a Turbo decoder to decode a code block, and functional unit 1742 can perform a cyclic redundancy check (CRC) on the decoded output. Except for the specifics of the decoding algorithms, operation of processing engine 1624 can be the same as operation of processing engine 1124 described above. As in 5G PDSCH pipeline 1110 described above, functional units 1741 and 1742 can operate as a sub-pipeline. Processing engine 1625, which can be similar or identical to processing engine 1125 described above, includes ST-HARQ functional unit 1751 and ST-DOUT functional unit 1752.

NCB buffers 1612, LLR buffers 1614, decoder input buffers 1616 and decoder output buffers 1618 can be structured similarly to their counterparts in 5G pipeline 1110. For example, NCB buffers 1612 can include six NCB buffers 1612-0 through 1612-5, each of which can be large enough to store LLRs for an encoded 4G code block. In one embodiment, each NCB buffer 1612-0 through 1612-5 can a size of 580×192 bits. More or fewer NCB buffers 1612 can be provided, and the size of the NCB buffers can be modified. NCB buffers 1612 can have a write interface 1702 and a read interface 1704, which can be similar or identical to write interface 1202 and read interface 1204 described above. LLR buffers 1614 can include, e.g., two distinct LLR buffers 1614-0, 1614-1, each of which can be large enough to store a sub-block of LLRs for input to de-rate-matching functional unit 1721. For instance, each LLR buffer 1614-0, 1614-1 can have size 10*256×6. More or fewer LLR buffers 1614 can be provided, and the size of the buffers can be modified. Decoder input buffers 1616 can also include, e.g., two distinct DIN buffers 1616-0, 1616-1, with each DIN buffer 1616-0, 1616-1 being large enough to store the data for a code block during decoding by Turbo decoder functional unit 1741. Similarly, decoder output buffers 1618 can include, e.g., two distinct DOUT buffers 1618-0, 1618-1, with each DOUT buffer 1618-0, 1618-1 being large enough to store the decoded data for a code block. For example, for 4G Turbo decoding, each DIN buffer 1616-0, 1616-1 can have a size of 6*384×48 bits while each DOUT buffer 1618-0, 1618-1 has a size of 192×32 bits. Each of NCB buffers 1612-0 through 1612-5, LLR buffers 1614-0 and 1614-1, DIN buffers 1616-0 and 1616-1, and DOUT buffers 1618-0 and 1618-1 can be mapped to a different virtual address in virtual register file 1632.

As with any implementation of pipeline 310 of FIG. 3, operation of pipeline 1610 can be defined using program code (e.g., firmware) executed by control processor 1640. The program code can be similar to process 1300 described above, with appropriate modifications for a 4G decoding pipeline. Control processor 1640 can issue instructions in order to pipeline 1610, and each instruction can enter the dispatch queue of the appropriate one of processing engines 1621-1625. The instructions can specify virtual addresses in the virtual address space of pipeline 1610, which encompasses locations in LLR buffers 1614, NCB buffers 1612, decoder input buffer 1616, decoder output buffers 1618, and (optionally) L1 memory locations. As described above with reference to FIGS. 6-8, receipt of an instruction in the dispatch queue of a processing engine 1621-1625 can trigger sending of a read-lock request and/or write-lock request to interlock controller 1630, and completion of an instruction (or a read or write operation) can trigger sending of a clear request to interlock controller 1630. Also as described above, prior to reading or writing, each processing engine can poll interlock controller 1630 with the virtual address to be read or written and can proceed upon receipt of a Grant response from interlock controller 1630. Interlock controller 1630 can implement the same logic described above to respond to read-lock, write-lock, clear, and poll requests. Thus, despite differences between 4G PDSCH decoding pipeline 1610 and 5G PDSCH decoding pipeline 1110, the interlock controllers 1630, 1130 can be identical.

It should be understood that multiple pipelines, including one or more instances of pipeline 1110 and one or more instances of pipeline 1610, can coexist in the same cellular modem processor. Each pipeline can have its own processing engines, its own buffers, its own interlock controller and virtual register file, and its own virtual address space. In some embodiments, the same control processor can dispatch instructions to multiple pipelines. For example, a control processor can dispatch instructions to one pipeline to do OFDM demapping for a received 5G (or 4G) transmit block, then dispatch instructions to pipeline 1610 (or pipeline 1110) to decode the transmit block. Alternatively, some or all of the pipelines can have their own dedicated control processor (which may allow more pipelines to operate in parallel). In the case of a sub-pipeline within a processing engine, the control processor can be implemented within the processing engine, and the dispatching of instructions can be driven by either hardware or firmware, depending on implementation. In each pipeline, data synchronization can be provided using a combination of firmware-based control (e.g., via control processor 340, 1140, 1640) and hardware-based dependency management (e.g., via interlock controller 330, 1130, 1630) as described herein Those skilled in the art with access to the present disclosure will appreciate that pipeline data synchronization using a combination of firmware-based control and hardware-based dependency management as described herein can provide various advantages over other approaches to flow-control or data synchronization.

For example, to implement purely hardware-based flow control, a system designer models each processing engine as a state machine, and possible state sequences depend on the possible pairs of processing engines (or functional units) that may operate successively on the same data block and how long each operation might take. In a pipeline with several processing engines, each having several possible states, the number of combination of states can become large, making it difficult to verify correct operation of the pipeline under all possible conditions. For firmware-based flow control, the hardware state machine can be simplified, but the firmware developer needs to consider the possible states and sequences of states and incorporate exceptions and event handling into the program code.

In contrast, in various embodiments described herein, each processing engine operates according to a simple state machine: if all data dependencies for the next instruction are satisfied, proceed; if not, wait. The same state machine applies to each processing engine (or functional unit) in the pipeline. The simplicity of the state machines can simplify validation of the hardware. Likewise, the firmware developer does not have to wrestle with a complex state machine; a firmware developer can simply write program code expressing the intended data flow. For instance, to cause processing engine 323 to operate on data output from processing engine 322, the developer can code an instruction executable by processing engine 322 that writes to a given address followed by an instruction executable by processing engine 323 that reads from that address. The developer can write such code almost intuitively, without knowing details of the hardware (including which processing engines execute which instructions).

Some embodiments can also provide advantages of flexibility. For instance, adapting hardware-based flow control to changes in the processing algorithms can be difficult and often requires new circuitry. In contrast, in embodiments described herein, at least some changes to algorithms can be implemented simply by updating the firmware. For example, if a new base graph or lifting size is added to the set of LDPC base graphs and lifting sizes defined for 5G PDSCH, the firmware executed by control processor 1140 can be updated to provide the new base graph or lifting size as a parameter to functional unit 1241. The new base graph or lifting size may change the amount of time required for functional unit 1241 to decode a code block; however, the same simple state machine can still apply, with interlock controller 1130 assuring that downthread instructions will wait until functional unit 1241 has finished decoding the code block.

In addition, some embodiments described herein provide a unified (or generic) data synchronization architecture. The interlock controller design and operation is not specific to any particular processing engines or functional units, or to any particular combination of processing engines and functional units. The interlock controller can be agnostic as to how the virtual address space maps to physical memory (e.g., buffers as described above); instead, the virtual addresses are used simply as indicators of data dependencies. Further, the decision logic in the interlock controller can operate independently of any particular functionality of any processing engine (e.g., which functional units are in a particular processing engine) or pipeline. Data dependencies are defined based on the order of instruction dispatch and on the input and output address information specified for each instruction, and the same decision logic to determine whether data dependencies have been satisfied can apply without regard to of the amount of data, particular operations performed on the data, or where the data is physically stored. Consequently, there is no need to design an interlock controller separately for each pipeline. In some embodiments, an instance of the same interlock controller circuitry can be deployed for every instance of every pipeline in the processor, with the only difference between interlock controller instances being the number of processing engines from which the interlock controller receives requests. This can greatly simplify the implementation of flow-control in a processor that has multiple disparate pipelines, such as a cellular modem processor.

While specific embodiments have been described, those skilled in the art will appreciate that variations and modifications are possible. For instance, a cellular modem processor can include any number and combination of pipelines and can support any number of radio access networks, including 4G and/or 5G. Each pipeline can have its own control processor, or one control processor may be configured to dispatch instructions to multiple pipelines, as desired. A pipeline can include any number of processing engines, and the assignment of particular operations (or functional units) to processing engines can be modified as desired. The processing engines or functional units can be vector engines that perform the same operations in parallel on multiple inputs. Buffers between pipeline stages can be implemented using any type of memory circuit and can include any combination of dedicated buffers (with only one processing engine writing and only one processing engine reading) and shared buffers (where multiple processing engines may read and/or write). An interlock controller can use a variety of techniques to track data dependencies. The virtual address space used by the interlock controller can use a variety of addressing schemes, provided that different virtual addresses map to different physical buffer (or other memory) locations and virtual addresses can be defined at any desired level of granularity, e.g., a word, a row, a buffer, etc. Instructions dispatched to a pipeline can specify virtual addresses for the interlock controller either directly (e.g., the input and output virtual addresses can be operands of a dispatched instruction) or indirectly (e.g., operands of a dispatched instruction can include addresses in any address space that the dispatch queues in the processing engines can map to the virtual address space used by the interlock controller). Examples of processes implemented in firmware and particular firmware instructions provided herein are also illustrative. Where names are used for particular functional units or instructions, such names are for ease of description and are not intended to define or imply any particular ISA.

All processes described herein are also illustrative and can be modified. Operations can be performed in a different order from that described, to the extent that logic permits; operations described above may be omitted or combined; and operations not expressly described above may be added.

Unless expressly indicated, the drawings are schematic in nature and not to scale. All numerical values presented herein are illustrative and not limiting. Reference to specific standards for cellular data communication (e.g., 4G LTE or 5G NR) are also for purposes of illustration; those skilled in the art with access to the present disclosure will be able to adapt the devices and methods described herein for compatibility with other standards.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise" or "can arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more."

Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must). The word "can" is used herein in the same permissive sense (i.e., having the potential to, being able to).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set {w, x, y, z}, these phrasings cover any single element of the set (e.g., w but not x, y, or z), any two elements (e.g., w and x, but not y or z), any three elements (e.g., w, x, and y, but not z), and all four elements. The phrase "at least one of . . . w, x, and z" thus refers to at least one element of the set {w, x, y, z}, thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, Applicant will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various embodiments may use computer program code to implement various features. Any such program code may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may include an internal storage medium of a compatible electronic device, which can be any electronic device having the capability of reading and executing the program code, and/or external storage media readable by the electronic device that can execute the code. In some instances, program code can be supplied to the electronic device via Internet download or other transmission paths.

Numerous variations and modifications will become apparent to those skilled in the art once the above disclosure is fully appreciated. It is intended that the following claims be interpreted to embrace all such variations and modifications.

What is claimed is:

1. A processing system comprising:
a plurality of processing engines, wherein the processing engines include functional units configured to execute an instruction having an input virtual address and an output virtual address, the plurality of processing engines including a first processing engine having a de-rate-matching functional unit configured to execute a de-rate-matching instruction, a second processing engine having a deshortening functional unit configured to execute a deshortening instruction; and a third processing engine having a decoder functional unit configured to execute a decode instruction;
a plurality of buffers coupled to the plurality of processing engines, wherein different buffers in the plurality of buffers are mapped to a different virtual address in a virtual address space, the plurality of buffers including a plurality of log likelihood ratio (LLR) buffers, a plurality of code block buffers, a plurality of decoder input buffers, and a plurality of decoder output buffers;
a control processor coupled to the processing engines and configured to dispatch a sequence of instructions to the processing engines, wherein the sequence of instructions includes a de-rate-matching instruction having an input virtual address that maps to a first one of the LLR buffers and an output virtual address that maps to a first one of the code block buffers, a deshortening instruction having an input virtual address that maps to the first one of the code block buffers and an output virtual address that maps to a first one of the decoder input buffers, and a decode instruction having an input virtual address that maps to the first of the decoder input buffers and an output virtual address that maps to a first one of the decoder output buffers; and
an interlock controller coupled to the plurality of processing engines and configured to manage data dependencies based on the input virtual addresses and the output virtual addresses of the instructions.

2. The processing system of claim 1 wherein the first processing engine, the second processing engine, and the third processing engine further include:
a respective dispatch queue configured to queue one or more instructions;
a respective dispatch queue interface configured to receive, in order, the dispatched instructions from the control processor, to queue the dispatched instructions in the dispatch queue for in-order execution, and to communicate a read-lock request for the input virtual address and a write-lock request for the output virtual address to the interlock controller; and
a respective instruction interface configured to communicate with the interlock controller to determine whether data dependencies for a next instruction queued in the dispatch queue are cleared, wherein the instruction interface initiates execution of the next instruction after the interlock controller indicates that the data dependencies are cleared.

3. The processing system of claim 1 wherein the third processing engine further includes a cyclic redundancy check (CRC) functional unit, wherein the CRC functional unit is pipelined with the decoder functional unit and configured to perform a CRC on a decoded code block generated by the decoder functional unit.

4. The processing system of claim 1 wherein the plurality of processing engines further includes a fourth processing engine that includes a first store functional unit configured to execute a store-output instruction having an input virtual address that maps to one of the decoder output buffers and a second store functional unit configured to execute a store hybrid automatic repeat request (HARQ) instruction having an input virtual address that maps to one of the code block buffers.

5. The processing system of claim 4 wherein the control processor is further configured to determine whether a code block output by the decoder functional unit passed a cyclic redundancy check (CRC), to dispatch the store-output instruction when the code block output by the decoder functional unit passed the CRC, and to dispatch the store HARQ instruction when the code block output by the decoder functional unit did not pass the CRC.

6. The processing system of claim 5 wherein the third processing engine further includes a CRC functional unit, wherein the CRC functional unit is pipelined with the decoder functional unit and configured to perform the CRC on a set of decoded output bits generated by the decoder functional unit and to write a CRC result to a status register, wherein the control processor is configured to read the status register to determine whether the code block output by the decoder functional unit passed the CRC.

7. The processing system of claim 1 wherein the plurality of processing engines further includes a fourth processing engine that includes a load functional unit configured to execute a load instruction having an input virtual address that maps to a shared memory and an output virtual address that maps to one of the LLR buffers.

8. The processing system of claim 7 wherein the de-rate-matching functional unit is configured to read source data from the one of the LLR buffers identified by the input virtual address, to generate updated data by combining the source data with existing data stored in the one of the code block buffers identified by the output virtual address and to write the updated data to the one of the code block buffers identified by the output virtual address.

9. The processing system of claim 8 wherein the control processor is configured to issue, for each of a plurality of chunks in a code block:
- the load instruction to the load functional unit, wherein the output virtual address of the load instruction is a chunk-dependent virtual address; followed by
- the de-rate-match instruction to the de-rate-matching functional unit, wherein for each of the plurality of chunks, the input virtual address of the de-rate-match instruction matches the output virtual address of the load instruction and the output virtual address of the de-rate match instruction is unchanged.

10. The processing system of claim 1 wherein the plurality of code block buffers includes a number of code block buffers that is greater than a number of processing engines in the plurality of processing engines, the plurality of LLR buffers includes exactly two LLR buffers, the plurality of decoder input buffers includes exactly two decoder input buffers, and the plurality of decoder output buffers includes exactly two decoder output buffers.

11. A cellular modem processor comprising:
- a plurality of processing pipelines including a first processing pipeline, wherein the first processing pipeline includes:
  - a plurality of processing engines, wherein the processing engines include functional units configured to execute an instruction having an input virtual address and an output virtual address, the plurality of processing engines including a first processing engine having a de-rate-matching functional unit configured to execute a de-rate-matching instruction, a second processing engine having a deshortening functional unit configured to execute a deshortening instruction; and a third processing engine having a decoder functional unit configured to execute a decode instruction;
  - a plurality of buffers coupled to the plurality of processing engines, wherein different buffers in the plurality of buffers are mapped to a different virtual address in a virtual address space, the plurality of buffers including a plurality of log likelihood ratio (LLR) buffers, a plurality of code block buffers, a plurality of decoder input buffers, and a plurality of decoder output buffers;
  - a control processor coupled to the processing engines and configured to dispatch a sequence of instructions to the processing engines, wherein the sequence of instructions includes a de-rate-matching instruction having an input virtual address that maps to a first one of the LLR buffers and an output virtual address that maps to a first one of the code block buffers, a deshortening instruction having an input virtual address that maps to the first one of the code block buffers and an output virtual address that maps to a first one of the decoder input buffers, and a decode instruction having an input virtual address that maps to the first of the decoder input buffers and an output virtual address that maps to a first one of the decoder output buffers; and
  - an interlock controller coupled to the plurality of processing engines and configured to manage data dependencies based on the input virtual addresses and the output virtual addresses of the instructions.

12. The cellular modem processor of claim 11 wherein the first processing pipeline is configured to decode physical downlink shared channel (PDSCH) data received via a 5G radio access network and the plurality of processing pipelines further includes a second processing pipeline configured to decode PDSCH data received via a 4G radio access network.

13. The cellular modem processor of claim 11 further comprising:
- a shared memory coupled to at least two of the processing pipelines, including the first processing pipeline.

14. The cellular modem processor of claim 13 wherein the plurality of processing engines further includes a fourth processing engine that includes a load functional unit configured to execute a load instruction that loads data from the shared memory and an output virtual address that maps to one of the LLR buffers.

15. The cellular modem processor of claim 11 wherein the plurality of processing engines further includes a fourth processing engine that includes a first store functional unit configured to execute a store-output instruction having an input virtual address that maps to one of the decoder output buffers and a second store functional unit configured to execute a store hybrid automatic repeat request (HARD) instruction having an input virtual address that maps to one of the code block buffers.

16. A method comprising:
- receiving, at a cellular modem processor having a decoding pipeline and a control processor, a transmit block for a physical downlink shared channel (PDSCH), the transmit block representing encoded data received via the PDSCH, the transmit block including a plurality of code blocks;
- dispatching, by the control processor, a sequence of instructions to the decoding pipeline for at least a first one of the plurality of code blocks, wherein the sequence of instructions includes a de-rate-match instruction and a decode instruction, wherein the instructions specify one or both of an input virtual address or an output virtual address, wherein a virtual address space for the decoding pipeline is defined such that virtual addresses in the virtual address space map to different ones of a plurality of buffers in the decoding pipeline;
- receiving the dispatched instructions in respective dispatch queues in a plurality of processing engines in the decoding pipeline, wherein the processing engine in which a particular issued instruction is received includes a functional unit configured to execute the particular issued instruction;
- sending, by the processing engines in response to receiving an instruction, a read-lock request for the input virtual address of the instruction and a write-lock request for the output virtual address of the instruction to an interlock controller of the decoding pipeline;
- issuing, from the dispatch queues, dispatched instructions to the functional units configured to execute the instructions, wherein instructions in a same one of the dispatch queues are issued in order and wherein a next instruction is issued from a particular dispatch queue only after the interlock controller confirms, based on the input virtual address and the output virtual address, that data dependencies for the next instruction have been cleared; and
- executing issued instructions by the functional units, wherein executing an issued instruction includes one or both of reading from the buffer mapped to the input virtual address or writing to the buffer mapped to the output virtual address.

17. The method of claim 16 wherein the sequence of instructions for the code block further includes a load instruction to write data from a shared memory into one of the plurality of buffers in the decoding pipeline, wherein an output virtual address of the load instruction specifies the one of the plurality of buffers.

18. The method of claim 17 wherein the code block includes a plurality of chunks and wherein issuing the sequence of instructions includes issuing, for each of a plurality of chunks in the code block:
   the load instruction, wherein the output virtual address of the load instruction is a chunk-dependent virtual address; followed by
   the de-rate-match instruction, wherein for each of the chunks, the input virtual address of the de-rate-match instruction matches the output virtual address of the load instruction and the output virtual address of the de-rate-match instruction is the same for each chunk.

19. The method of claim 16 wherein the control processor is further configured such that a first instruction in the sequence of instructions is dispatched for a second one of the code blocks before a last instruction in the sequence of instructions for a first of the code blocks is executed.

20. The method of claim 16 wherein the sequence of instructions includes:
   a load instruction to read data for the code block from an externally-shared memory, the load instruction having an output virtual address specifying a first one of the buffers as a destination for writing the data for the code block, wherein the load instruction is prior to the de-rate-match instruction and the decode instruction in the sequence; and
   a store instruction to write decoded data for the code block to the externally-shared memory, the store instruction having an input virtual address specifying a second one of the buffers as a source for the decoded data, wherein the store instruction is subsequent to the de-rate-match instruction and the decode instruction in the sequence,
   wherein the store instruction is the only instruction in the sequence that writes data to the externally-shared memory.

* * * * *

UNITED STATES PATENT AND TRADEMARK OFFICE
CERTIFICATE OF CORRECTION

PATENT NO. : 11,616,596 B1
APPLICATION NO. : 17/448867
DATED : March 28, 2023
INVENTOR(S) : Thirunathan Sutharsan et al.

Page 1 of 1

It is certified that error appears in the above-identified patent and that said Letters Patent is hereby corrected as shown below:

In the Specification

Column 5, Line 21, delete "hybrid automatic repeat request (HARD) instruction having" and insert --hybrid automatic repeat request (HARQ) instruction having--

In the Claims

Column 48, Claim 15, Line 20, delete "execute a store hybrid automatic repeat request (HARD)" and insert --execute a store hybrid automatic repeat request (HARQ)--

Signed and Sealed this
Twenty-fifth Day of April, 2023

Katherine Kelly Vidal
*Director of the United States Patent and Trademark Office*